(12) United States Patent
Kompella et al.

(10) Patent No.: US 10,116,574 B2
(45) Date of Patent: Oct. 30, 2018

(54) SYSTEM AND METHOD FOR IMPROVING TCP PERFORMANCE IN VIRTUALIZED ENVIRONMENTS

(71) Applicant: AppFormix Inc., San Jose, CA (US)

(72) Inventors: Ramana Kompella, Santa Clara, CA (US); Sumeet Singh, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 165 days.

(21) Appl. No.: 15/162,589

(22) Filed: May 23, 2016

(65) Prior Publication Data

US 2016/0269302 A1    Sep. 15, 2016

Related U.S. Application Data

(63) Continuation of application No. 14/290,509, filed on May 29, 2014, now Pat. No. 9,385,959, which is a
(Continued)

(51) Int. Cl.
*H04L 12/851* (2013.01)
*H04L 12/801* (2013.01)
(Continued)

(52) U.S. Cl.
CPC ...... *H04L 47/2483* (2013.01); *G06F 9/45558* (2013.01); *H04L 41/0893* (2013.01);
(Continued)

(58) Field of Classification Search
CPC . H04L 47/2483; H04L 41/0893; H04L 47/12; H04L 47/193; H04L 47/20
See application file for complete search history.

(56) References Cited

U.S. PATENT DOCUMENTS

| D379,695 S | 6/1997 | Africa |
|---|---|---|
| 6,182,157 B1 | 1/2001 | Schlener et al. |

(Continued)

FOREIGN PATENT DOCUMENTS

| WO | 2009089051 A2 | 7/2009 |
|---|---|---|
| WO | 2013184846 A1 | 12/2013 |
| WO | 2015048326 | 4/2015 |

OTHER PUBLICATIONS

Response to Extended European Search Report dated May 2, 2017, from counterpart European Application No. 14847344.0, filed Nov. 17, 2017, 19 pp.
(Continued)

*Primary Examiner* — Albert T Chou
(74) *Attorney, Agent, or Firm* — Shumaker & Sieffert, P.A.

(57) ABSTRACT

Example embodiments described herein provide systems and methods for transmitting data packets between a protocol sender and a protocol receiver in a cloud environment, having either the protocol sender or the protocol receiver residing within a virtualized host. A protocol acceleration module may observe the data packets transmitted along the data path between the protocol sender and the protocol receiver using protocol stack configuration information of the protocol sender. The protocol acceleration module may override the protocol stack configuration information with policy-based protocol stack configuration information such that data packets transmitted from the protocol acceleration module to the protocol receiver use the policy-based protocol stack configuration information. For various embodiments, the protocol stack configuration information of the protocol sender is not modified.

20 Claims, 22 Drawing Sheets

Related U.S. Application Data continuation-in-part of application No. 14/149,621, filed on Jan. 7, 2014.

(60) Provisional application No. 61/882,768, filed on Sep. 26, 2013.

(51) Int. Cl.
| | |
|---|---|
| *H04L 12/807* | (2013.01) |
| *H04L 12/841* | (2013.01) |
| *H04L 12/24* | (2006.01) |
| *H04L 12/813* | (2013.01) |
| *H04L 12/859* | (2013.01) |
| *H04L 29/06* | (2006.01) |
| *G06F 9/455* | (2018.01) |

(52) U.S. Cl.
CPC ............ *H04L 47/12* (2013.01); *H04L 47/193* (2013.01); *H04L 47/20* (2013.01); *H04L 47/2475* (2013.01); *H04L 47/27* (2013.01); *H04L 47/28* (2013.01); *H04L 69/161* (2013.01); *G06F 2009/45595* (2013.01)

(56) References Cited

U.S. PATENT DOCUMENTS

| | | | |
|---|---|---|---|
| 6,493,316 B1 | 12/2002 | Chapman et al. | |
| 6,741,563 B2 | 5/2004 | Packer | |
| 6,754,228 B1 | 6/2004 | Ludwig | |
| 7,389,462 B1 | 6/2008 | Wang et al. | |
| 7,433,304 B1 | 10/2008 | Galloway et al. | |
| 8,102,881 B1 | 1/2012 | Vincent | |
| 9,385,959 B2* | 7/2016 | Kompella | H04L 47/2483 |
| 9,641,435 B1 | 5/2017 | Sivaramakrishnan | |
| 9,906,454 B2 | 2/2018 | Prakash et al. | |
| 2002/0031088 A1 | 3/2002 | Packer | |
| 2004/0088412 A1 | 5/2004 | John et al. | |
| 2005/0091657 A1 | 4/2005 | Priem | |
| 2006/0101144 A1 | 5/2006 | Wiryaman et al. | |
| 2006/0271680 A1 | 11/2006 | Shalev et al. | |
| 2007/0014246 A1 | 1/2007 | Aloni et al. | |
| 2007/0024898 A1 | 2/2007 | Uemura et al. | |
| 2008/0222633 A1 | 9/2008 | Kami | |
| 2008/0253325 A1 | 10/2008 | Park et al. | |
| 2008/0320147 A1 | 12/2008 | DeLima et al. | |
| 2009/0028061 A1* | 1/2009 | Zaencker | H04L 43/00 370/252 |
| 2009/0183173 A1 | 7/2009 | Becker et al. | |
| 2010/0011270 A1 | 1/2010 | Yamamoto et al. | |
| 2010/0125477 A1 | 5/2010 | Mousseau et al. | |
| 2011/0128853 A1 | 6/2011 | Nishimura | |
| 2011/0276699 A1 | 11/2011 | Pedersen | |
| 2012/0002669 A1 | 1/2012 | Diellerle et al. | |
| 2012/0054330 A1 | 3/2012 | Loach | |
| 2012/0096167 A1 | 4/2012 | Free et al. | |
| 2012/0131225 A1 | 5/2012 | Chiueh et al. | |
| 2012/0210318 A1 | 8/2012 | Sanghvi et al. | |
| 2012/0303923 A1 | 11/2012 | Behera et al. | |
| 2012/0311138 A1 | 12/2012 | Inamdar et al. | |
| 2013/0003553 A1 | 1/2013 | Samuels et al. | |
| 2013/0044629 A1* | 2/2013 | Biswas | H04L 67/2804 370/254 |
| 2013/0163428 A1* | 6/2013 | Lee | H04L 47/28 370/235 |
| 2013/0205037 A1 | 8/2013 | Biswas | |
| 2014/0007094 A1 | 1/2014 | Jamjoom et al. | |
| 2014/0019807 A1 | 1/2014 | Harrison et al. | |
| 2014/0026133 A1 | 1/2014 | Parker | |
| 2014/0123133 A1 | 5/2014 | Luxenberg | |
| 2014/0130039 A1 | 5/2014 | Chaplik et al. | |
| 2014/0189684 A1 | 7/2014 | Zaslavsky et al. | |
| 2014/0192639 A1 | 7/2014 | Smirnov | |
| 2014/0241159 A1* | 8/2014 | Kakadia | H04W 24/02 370/235 |
| 2014/0258535 A1 | 9/2014 | Zhang | |
| 2014/0304320 A1 | 10/2014 | Taneja et al. | |
| 2014/0334301 A1 | 11/2014 | Billaud et al. | |
| 2015/0085665 A1 | 3/2015 | Kompella et al. | |
| 2015/0089500 A1 | 3/2015 | Kompella et al. | |
| 2015/0215214 A1 | 7/2015 | Ng et al. | |
| 2016/0080206 A1 | 3/2016 | Prakash et al. | |
| 2016/0080207 A1 | 3/2016 | Prakash et al. | |
| 2016/0277249 A1 | 9/2016 | Singh et al. | |
| 2017/0033995 A1 | 2/2017 | Banka et al. | |
| 2017/0160744 A1 | 6/2017 | Chia et al. | |

OTHER PUBLICATIONS

"Transmission Control Protocol," DARPA Internet Program Protocol Specification, Sep. 1981, RFC 793, 90 pp.

International Preliminary Report on Patentability from International Application No. PCT/US2014/057514, dated Mar. 29, 2016, 11 pp.

Response to Final Office Action dated Dec. 20, 2016, from U.S. Appl. No. 14/149,621, filed Feb. 13, 2017, 24 pp.

Advisory Action from U.S. Appl. No. 14/149,621, dated Feb. 21, 2017, 3 pp.

Amendment in Response to Final Office Action dated Dec. 20, 2016 and Advisory Action dated Feb. 21, 2017, from U.S. Appl. No. 14/149,621, filed Mar. 20, 2017, 13 pp.

International Search Report and Written Opinion for PCT Application Serial No. PCT/US16/42606, dated Sep. 30, 2016, 12 pages.

final Office Action for U.S. Appl. No. 14/149,621, dated Dec. 20, 2016, 23 pages.

U.S. Appl. No. 14/290,509, filed May 29, 2014.

U.S. Appl. No. 14/149,621, filed Jan. 7, 2014.

Extended Search Report from counterpart European Application No. 14847344.0, dated May 2, 2017, 8 pp.

Response to Office Action dated Apr. 14, 2017, from U.S. Appl. No. 14/149,621, filed Jul. 14, 2017, 13 pp.

International Search Report of International Application No. PCT/US2014/057514, dated Dec. 31, 2014, 2 pp.

Office Action from U.S. Appl. No. 14/149,621, dated Apr. 14, 2017, 20 pp.

International Search Report and Written Opinion for International Application Serial No. PCT/US2014/057514, dated Dec. 31, 2014, 10 pgs.

Gamage, Sahan, et al., "Protocol Responsibility Offloading to Improve TCP Throughput in Virtualized Environments," ACM Transactions on Computer Systems, 31(3) Article 7, Aug. 2013, pp. 7:1-7:34.

Gamage, Sahan, et al., "Opportunistic flooding to improve TCP transmit performance in virtualized clouds," Proceedings of the 2nd ACM Symposium on Cloud Computing, Oct. 26, 2011, 14 pages.

Kangarlou, Ardalan, et al., "vSnoop: Improving TCP Throughput in Virtualized Environments via Acknowledgement Offload," International Conference for High Performance Computing, Networking, Storage and Analysis (SC), Nov. 2010, pp. 1-11.

Klien, Thierry E., et al., "Improved TCP Performance in Wireless IP Networks through Enhanced Opportunistic Scheduling Algorithms," IEEE Global Telecommunications Conference, vol. 5, 2004, pp. 2744-2748.

Office Action for U.S. Appl. No. 14/149,621, dated May 6, 2016, 27 pages.

Office Action for U.S. Appl. No. 14/290,509, dated Nov. 10, 2015, 24 pages.

Notice of Allowance for U.S. Appl. No. 14/290,509, dated Mar. 9, 2016, 10 pages.

"Creating Projects in OpenStack for Configuring Tenants in Contrail," Juniper Networks, Inc., Contrail, Jan. 16, 2015, 2 pp.

"Host Aggregates," OpenStack Docs, accessed from https://docs.openstack.org/nova/latest/user/aggregates.html, accessed on Feb. 14, 2018, 3 pp.

"Improving Real-Time Performance by Utilizing Cache Allocation Technology—Enhancing Performance via Allocation of the Processor's Cache," White Paper, Intel® Corporation, Apr. 2015, 16 pp.

Extended Search Report from counterpart European Application No. 17163963.6, dated Jan. 5, 2018, 11 pp.

(56) References Cited

OTHER PUBLICATIONS

Hopps, "Analysis of an Equal-Cost Multi-Path Algorithm," RFC 2992, Network Working Group, Nov. 2000, 8 pp.
Roy, "AppFormix and Intel RDT Integration: Orchestrating Virtual Machines on OpenStack," AppFormix Blog, Apr. 1, 2016, 5 pp.
Roy, "CPU shares insufficient to meet application SLAs," APPFORMIX-TR-2016-1, Mar. 2016, 3 pp.
Roy, "Meet Your Noisy Neighbor, Container," AppFormix Blog, Mar. 31, 2016, 8 pp.
Singh, "AppFormix: Realize the Performance of Your Cloud Infrastructure—Solution Brief," AppFormix, Intel® corporation, Mar. 27, 2016, 7 pp.
Ramakrishnan et al., "The Addition of Explicit Congestion Notification (ECN) to IP," RFC 3168, Network Working Group, Sep. 2001, 63 pp.
Office Action from U.S. Appl. No. 14/149,621, dated Feb. 6, 2018, 21 pp.
U.S. Appl. No. 14/811,957, by Juniper Networks, Inc. (Inventors: Banka et al.), filed Jul. 29, 2015.
U.S. Appl. No. 62/487,254, by Juniper Networks, Inc. (Inventors: Roy et al.), filed Apr. 19, 2017.
U.S. Appl. No. 151946,645, by Juniper Networks, Inc. (Inventors: Chitalia et al.), filed Apr. 5, 2018.
Response filed May 7, 2018 to the Office Action from U.S. Appl. No. 14/149,621, dated Feb. 6, 2018, 5 pp.
Response to the Extended Search Report from counterpart European Application No. 17163963.6, dated Jan. 5, 2018, filed Jul. 31, 2018, 16 pp.
Office Action from counterpart U.S. Appl. No. 15/084,927, dated Jun. 12, 2018, 11 pp.
Response to the Office Action dated Jun. 12, 2018 from counterpart U.S. Appl. No. 15/084,927, filed Sep. 12, 2018, 15 pp.

\* cited by examiner

500

Flow Table 1600

| | VLAN 1610 | Virtual Network ID 1620 | Protocol 1630 | Source IP 1640 | Destination IP 1650 | Source Port 1660 | Destination Port 1670 | Configuration 1680 |
|---|---|---|---|---|---|---|---|---|
| 1690 | 2 | 33902 | TCP | 10.1.1.1 | 10.2.2.2 | 10000 | 80 | config1 |
| 1691 | 2 | 33902 | TCP | 10.1.1.1 | 10.2.2.2 | 20000 | 80 | config2 |

*FIG. 16*

SYSTEM AND METHOD FOR IMPROVING TCP PERFORMANCE IN VIRTUALIZED ENVIRONMENTS

This application is a continuation of U.S. patent application Ser. No. 14/290,509, entitled "SYSTEM AND METHOD FOR IMPROVING TCP PERFORMANCE IN VIRTUALIZED ENVIRONMENTS," filed on May 29, 2014, which is a continuation-in-part of U.S. patent application Ser. No. 14/149,621, entitled "SYSTEM AND METHOD FOR IMPROVING TCP PERFORMANCE IN VIRTUALIZED ENVIRONMENTS," filed on Jan. 7, 2014, which claims the benefit of priority under 35 U.S.C. § 119(e) of U.S. Provisional Patent Application Ser. No. 61/882,768, entitled "SYSTEM AND METHOD FOR IMPROVING TCP PERFORMANCE IN VIRTUALIZED ENVIRONMENTS," filed on Sep. 26, 2013, each of which is herein incorporated by reference in its entirety.

TECHNICAL FIELD

This application relates to a method and system for use in virtualized computing environments, according to one embodiment, and more specifically, for improving network protocol performance in virtualized computing environments.

BACKGROUND

Large enterprises today predominantly use virtualized data centers for their information technology (IT) infrastructure. Virtualization provides two benefits to the enterprise computing landscape. The first benefit is that virtualization can provide significant improvements to efficiency, as physical machines become significantly powerful with the advent of multicore architectures with a large number of cores per physical CPU. Further, memory has become extremely cheap today. For example, it is not uncommon to see hundreds of gigabytes of RAM available in many commodity servers. Thus, one can consolidate a large number of virtual machines on to one physical machine. The second benefit is that virtualization provides significant control over the infrastructure. As computing resources become fungible resources, such as the cloud model, provisioning and managing the computing infrastructure becomes very easy. Thus, enterprise IT staff recommends virtualized clusters in data centers for their management benefits in addition to the efficiency and better return on investment (ROI) that virtualization provides.

While virtualization is becoming widely adopted worldwide, modern operating systems and network protocols, historically, have not been designed with virtualization in mind. Therefore, traditional Operating Systems (OS) have limitations that make them perform less efficiently in virtualized environments. Basically, as a layer of indirection in the form of a hypervisor is added to a physical server to abstract the CPU, memory and I/O resources, new types of performance bottlenecks, such as reduction in network protocol throughput (e.g., Transport Control Protocol over Internet Protocol (TCP/IP) throughput), are created that were nonexistent before.

Virtual machines (VMs) are typically assigned virtual computing instances called vCPUs (or virtual CPUs). As virtualized servers get significantly consolidated in data centers, there are a large number of VMs sharing the available CPU resources, i.e., the available physical cores (physical CPUs or pCPUs). The ratio of vCPUs allocated to all the running VMs to total available pCPUs is typically known as the overcommit ratio. The level of overcommit in different environment varies significantly, but it is rarely close to 1. The main reason for this is the fact that, in many virtualized environments, the average CPU utilization is quite low. Because of this reason, a high overcommit ratio is desirable to get the best ROI from the available computing resources.

Unfortunately, server consolidation has a significant negative impact on the performance of transport protocols such as TCP. In virtualized data centers, there is often a lot of server-to-server traffic running over the TCP protocol. The network latencies (measured as the time it takes from one server's network interface card (NIC) to the other server's NIC) are typically in the order of a few microseconds. Hypervisors, such as VMware, have become extremely efficient at keeping the number of instructions executed to process an individual packet to a very small number. Therefore, as packets arrive from the network and the VM is scheduled, they experience very little additional latency due to virtualization. The key problem, however, is that when a given VM is not scheduled, network data transfer for a given connection within that VM effectively stops, since TCP needs both ends to be active for data transfer to progress. Even when only one end is transmitting data to the other end, it still needs the other end to respond back with acknowledgements before the transmitting end can transmit more data.

Empirical analysis has shown that traffic patterns in real enterprise clusters follow what is known as a power law distribution. Effectively, out of a given number of VMs, only a small number of them will actually generate traffic at any given time. Further, this power law is applicable even in the time domain. That is, a given VM will generate traffic every once in a while, and not all the time. Given these conditions, we can observe that all available network resources are not being used by the VM transmitting or receiving the traffic, if there are other computer-oriented VMs sharing available CPU resources that cause the network-intensive VMs to get scheduled in and out, thus degrading TCP performance significantly.

As servers are more consolidated, which occurs in environments such as the Virtual Desktop Infrastructure (VDI) space, the throughput degradation is even more significant. Since TCP is a bi-directional protocol, we observe the TCP throughput degradation in both directions—receive and send sides. The problem is even worse when a virtualized TCP sender is transmitting packets to a virtualized TCP receiver, since both ends are scheduled independently, which means that any of these ends can be off at a given time independent of each other. Since there is a much higher probability that their scheduling rounds may not be aligned, the throughput degradation is roughly double the amount when only one of the ends is virtualized and contending for CPU resources.

Various approaches to improve TCP processing in virtualized environments exist today. One approach is to keep the CPU overcommit really low (close to 1). In this case, the problem of CPU contention does not even arise and the problem does not manifest. The drawback of this approach is that the main benefit of virtualization, namely server consolidation, is largely lost.

A second approach is to have the VM offload the TCP processing to dedicated hardware referred to as the TCP Offload Engine (TOE). Since TOEs have dedicated hardware to offload the TCP processing, TCP processing can be performed even when the VM is not scheduled. Unfortunately, this approach calls for specialized hardware that can be expensive and quite hard to change and reconfigure. Further, it may call for proprietary drivers in the guest OSs that may be difficult in many environments such as the cloud. Due to these and possibly other reasons, this approach has not proved to be particularly popular in today's commodity data center networks.

A third possible approach is to change the scheduler to favor network-bound VMs that transmit and receive data packets. Unfortunately, it is difficult to implement this third approach since there is always an inherent need to ensure fairness across different VMs that contend for CPU resources.

Fourth, congestion control and acknowledgement generation can be performed by offloading protocol responsibility to a hypervisor with the help of a specialized plugin. This is a less intrusive option since it does not terminate TCP connections fully; however, since hypervisors are scheduled typically on dedicated CPU cores, or are given higher priority, they can significantly boost TCP performance of different VMs. This approach has been previously proposed in the following two academic papers: (1) *vSnoop: Improving TCP Throughput in Virtualized Environments via Acknowledgement Offload*, Ardalan Kangarlou, Sahan Gamage, Ramana Rao Kompella, Dongyan Xu, in the Proceedings of ACM Supercomputing, New Orleans, La., November 2010 and (2) *Opportunistic Flooding to Improve TCP Transmit Performance in Virtualized Clouds*, Sahan Gamage, Ardalan Kangarlou, Ramana Rao Kompella, Dongyan Xu, in the Proceedings of ACM Symposium on Cloud Computing, (SOCC 2011), Cascais, Portugal, October 2011.

However, the Xen hypervisor approach described in these two papers has various limitations. For example, on the receive path, vSnoop acknowledges packets only if there is room in a small buffer, called a "shared buffer", located in the virtual NIC between the hypervisor and guest OS. The vSnoop approach is dependent on the specific vNIC buffer of the Xen hypervisor, and restricted by the design and implementation of the Xen vNIC buffer. If there is no room in that buffer, vSnoop cannot acknowledge packets since the packet may be lost. Further, in a realistic deployment scenario, accessing the buffer is both challenging as well as intrusive. Another limitation is on the transmit path. The particular implementation described in these papers uses a Xen hypervisor, which has a proprietary virtual device channel called the Xen device channel that is used to coordinate between the TCP stack in the guest and the vFlood module. This particular design calls for intrusive changes to the hypervisor-guest interface boundary, which is not desirable.

Thus, a system and method for improving TCP performance in virtualized environments, that is both effective and practically deployable, is needed.

BRIEF DESCRIPTION OF THE DRAWINGS

The various embodiments are illustrated by way of example, and not by way of limitation, in the figures of the accompanying drawings, in which:

FIG. 16 illustrates an example embodiment of a flow table.

DETAILED DESCRIPTION

Figure 1:
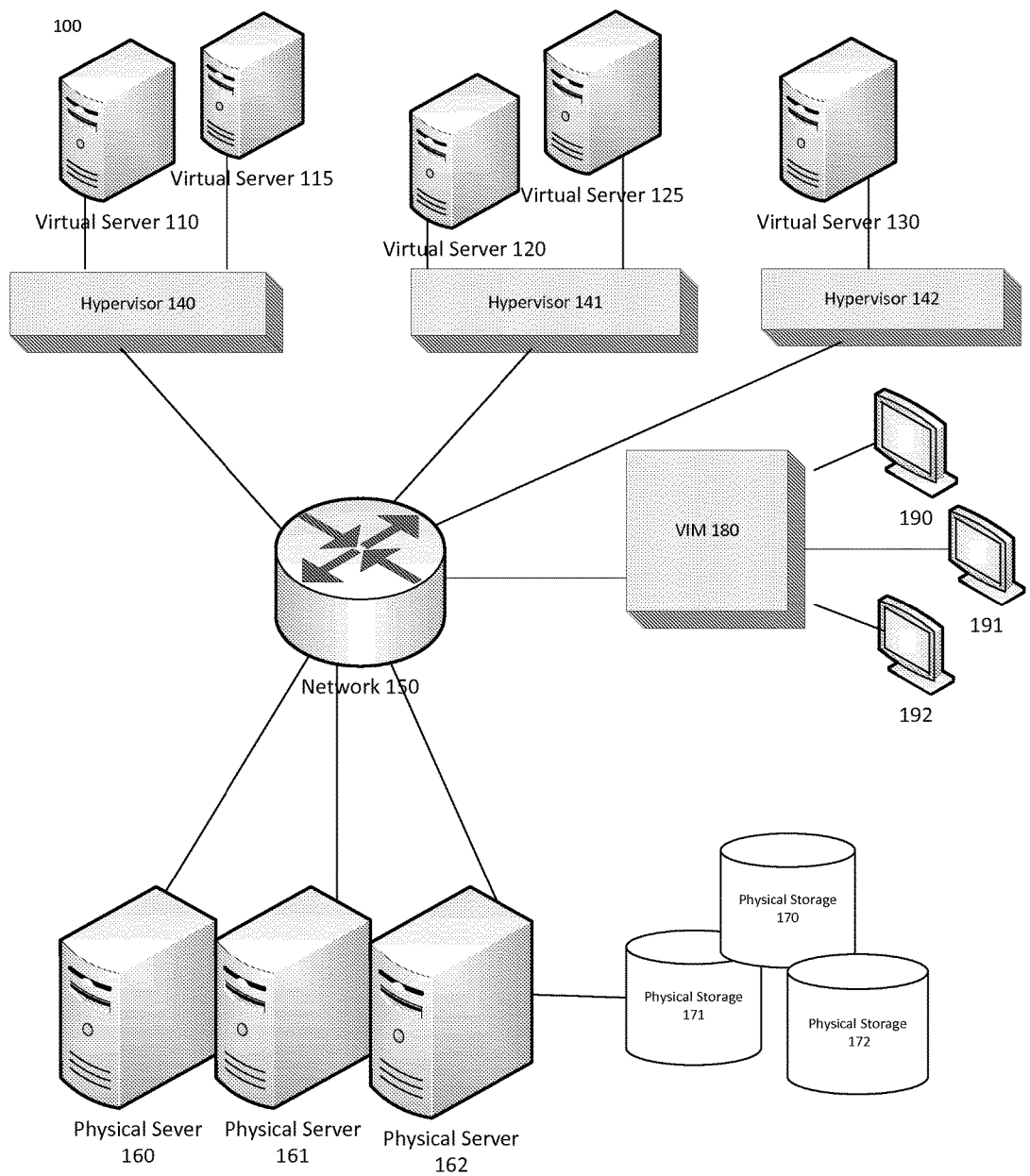
FIG. 1 is a diagram depicting a data center, according to one embodiment, illustrating both physical and virtualized IT resources.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a marketplace environment, the embodiments are given merely for clarity in disclosure. Thus, any type of electronic publication, electronic commerce, social networking, or electronic business system and method, including various system architectures, may employ various embodiments of the system and method described herein and may be considered as being within a scope of example embodiments. Each of a variety of example embodiments is discussed in detail below.

Example embodiments described herein provide systems and methods for transmitting data packets between a protocol sender and a protocol receiver in a cloud environment, having either the protocol sender or the protocol receiver residing within a virtualized host. For one embodiment, the data packets transmitted may be TCP data packets such that the protocol senders and receivers may be TCP protocol senders and receivers. A protocol acceleration module (also referred to as a vTCP module or TCP acceleration module in various embodiments), may be installed and maintained anywhere along the data path from the protocol sender/receiver within the guest OS to the physical NIC. For some embodiments, the protocol acceleration module may plug into or be integrated within a hypervisor. The protocol acceleration module may observe the data packets transmitted along the data path between the protocol sender and the protocol receiver using protocol stack configuration information (e.g., TCP stack configuration information) of the protocol sender (e.g., TCP sender). The protocol acceleration module may override the protocol stack configuration information with policy-based protocol stack configuration information (e.g., policy-based TCP stack configuration information) such that data packets transmitted from the protocol acceleration module to the protocol receiver use the policy-based protocol stack configuration information. For various embodiments, the protocol stack configuration information of the protocol sender is not modified.

In further embodiments, the policy-based protocol stack configuration information is created at a management interface of a system. The management interface may be an outside management entity used to configure and manage the protocol acceleration module. The management interface may provide a centralized way to administer, configure and control the behavior of internet protocols (such as TCP) in a data center. For example embodiments, the management interface may include various input devices and user interfaces capable of receiving user input (such as a data center administrator) to adjust or modify the protocol configuration parameters or settings. In further embodiments, the protocol configuration parameters or settings may be modified dynamically based on feedback from the protocol acceleration module, or another system capable of monitoring and evaluating the protocol behavior and performance along the data path between the protocol sender and protocol receiver.

In various embodiments, the protocol configuration parameters may be configured on a per-virtual machine basis and/or per-flow basis. In one example a data flow is defined as any combination of fields within the data packets. In other examples, multiple virtual machines may be managed and configured using a management interface by a user (such as a data center administrator). In other embodiments, the outside management entity provides the policy-based protocol configuration information to the protocol acceleration module such that data packets transmitted from the protocol acceleration module to the protocol receiver use the policy-based protocol stack configuration information without modifying the protocol stack configuration information of the protocol sender.

The Transmission Control Protocol (TCP) is a transmission control protocol developed by the Internet Engineering Task Force (IETF). TCP resides in the Transport Layer and is one of the core protocols of the Internet protocol suite (IP). TCP provides a communications service at an intermediate level between an application program and the Internet Protocol (IP). The TCP connection is managed by the host operating system through a programming interface that represents the local end-point for communications, the Internet socket. While IP handles actual delivery of the data (or a message), TCP keeps track of the individual units of data transmission, called segments, that divides the message for efficient routing through the network. TCP is widely used by many of the most popular Internet applications, including the World Wide Web (WWW), E-mail, File Transfer Protocol, Secure Shell, peer-to-peer file sharing, and some streaming media applications. When an application program desires to send a large chunk of data across the Internet using IP, the software can issue a single request to TCP.

IP works by exchanging packets, which is a sequence of bytes and consists of a header followed by a body. The Internet Layer encapsulates each TCP segment into an IP packet by adding a header for the destination IP address. When the client program at the destination computer receives them, the TCP layer (Transport Layer) reassembles the individual segments and ensures they are correctly ordered and error free as it streams them to an application. TCP's reliable stream delivery service guarantees that all bytes received are identical with bytes sent and in the correct order. A version of the TCP specification can be found in the IETF RFC 793 or later IETF TCP RFCs releases.

TCP Protocol operations have three phases: (1) connection establishment phase, (2) data transfer phase, and (3) connection termination phase. TCP uses a three-way handshake to establish a bi-directional connection. The connection has to be established before entering into the data transfer phase. After data transmission is complete, the connection termination closes established virtual circuits and releases all allocated resources.

The TCP data transfer provides an ordered data transfer, where the destination host rearranges the data packets according to the sequence number. Lost packets are retransmitted; for example, any segment in the TCP stream not acknowledged is retransmitted. Flow control is used to limit the rate at which a sender transfers data to guarantee reliable delivery. For flow control, the receiver continually hints to the sender how much data can be received (i.e., controlled by the sliding window). When the receiving host's buffer fills, the next acknowledgement contains a 0 in the window size, indicating to stop transfer and allow the data in the buffer to be processed. Congestion control uses several mechanisms to control the rate of data entering the network, keeping the data flow below a rate that would trigger a collapse. For congestion control, acknowledgments for data sent, or lack of acknowledgements, are used by senders to infer network conditions between the TCP sender and receiver. Coupled with timers, TCP senders and receivers can alter the behavior of the flow of data.

The various example embodiments described herein provide TCP performance improvements by offloading some of the TCP processing (between a TCP sender and TCP receiver) to a TCP acceleration module without modifying the normal TCP processing at the TCP sender and TCP receiver. The TCP acceleration module, located within a hypervisor, is also referred to as the vTCP module. The TCP processing performed by the TCP acceleration module is generally for the fast path processing. This refers to TCP data transfer processing of in-sequence data packets when the TCP acceleration module has available buffer space to store data packets.

The TCP acceleration module may be installed and maintained anywhere along the data path from the TCP sender/receiver within the guest OS to the physical NIC. The TCP acceleration module includes its own buffer and does not rely on the shared buffer with vNIC interfaces. By having its own buffer, the TCP acceleration module does not depend on up-to-date information about the occupancy of the vNIC ring buffer and has the flexibility to be located at various locations in along the data path. Various embodiments of the TCP acceleration module incorporate a packet loss recovery algorithm to allow recovering from any potential packet losses that occur between the TCP acceleration module and the guest OS TCP sender/receiver, if packets are acknowledged early and if the vTCP buffer is not full.

During fast path processing, various TCP data transfer processing functions are offloaded to the TCP acceleration module, such as acknowledgement generation, by having the TCP acceleration module implement an early acknowledgement process along with a packet loss recovery process. Due to network congestion, traffic load balancing, or other unpredictable network behaviors, IP packets can be lost, duplicated, or delivered out-of-order. TCP detects these problems, requests retransmission of lost data, rearranges out-of-order data, and even helps to minimize network congestion. To the extent that these TCP data transfer processes are performed in the fast path mode, these processes may be offloaded to the TCP acceleration module to accelerate the TCP data transfer. When operating in the slow path mode, the TCP acceleration module is bypassed, and normal TCP processing between the TCP sender and TCP receiver occurs without TCP processing performed by the TCP acceleration module. As described in more detail below, various accelerated TCP data packet processing techniques can be realized based on the various embodiments described herein. In alternative embodiments, network or internet protocols other than the TCP/IP protocol may be used.

FIG. 1 is a diagram depicting a data center 100, according to one embodiment, illustrating both physical and virtualized IT resources. The data center 100 shows various components working together to provide virtualized IT resources supported by physical IT resources. Grouping IT resources in data centers allows for power sharing, higher efficiency in shared IT resource usage, and improved accessibility for IT personnel. Modern data centers house centralized IT resources, such as servers, databases, networking and telecommunication devices, and software systems. Such data centers may include both physical and virtualized IT resources. With virtualization, multiple virtual copies of the server environment can be hosted by a single physical server. Each copy can be provided to different users, can be configured independently, and can contain its own operating systems and applications.

The physical IT resources shown in FIG. 1 include the physical servers 160, 161 and 162; physical storage 170, 171 and 173; and network hardware 150. Also included in the hardware are computer systems 190, 191 and 192 in communication with the virtualization infrastructure management (VIM) tools 180.

Server virtualization is the process of abstracting IT hardware into virtual servers using virtualization software. A virtual server is created through virtualization software by allocating physical IT resources and installing an operating system. Virtual servers use their own guest operating systems, which are independent of the operating system in which they were created. The virtual IT resources in FIG. 1 include virtual servers or VMs 110, 115, 120, 125, and 130 along with hypervisors 140, 141 and 142 and VIM 180. The hypervisors 140, 141 and 142 are primarily used to generate virtual server instances of a physical server. A hypervisor is generally limited to one physical server and can therefore only create virtual images of that server. For example, hypervisor 140 can create virtual images of physical server 160 in VMs 110 and 115. The VIM 180 provides a range of features for administering multiple hypervisors across physical servers.

A technique known as positive acknowledgment with retransmission is used to guarantee reliable TCP data packet transfers. This technique calls for the TCP receiver to respond with an acknowledgement message as it receives the data. The TCP sender keeps a record of each packet it sends. The TCP sender also maintains a timer from when the packet was sent, and retransmits a packet if the timer expires or timeout occurs before the message has been acknowledged. The timer is needed in case a packet gets lost or corrupted. Referring to FIG. 1, a TCP connection may be established between one of the physical servers 160, 161 and 162 and one of the virtual servers 110, 115, 120, 125, 130. For example, if a TCP connection can be established between physical server 160 and virtual server 110, either physical server 160 or virtual server 110 may be the TCP receiver or TCP sender, since the connection is bidirectional. The positive acknowledgement with retransmission technique described in this paragraph can be used to transfer TCP packet data between physical server 160 and virtual server 110.

Figure 2:
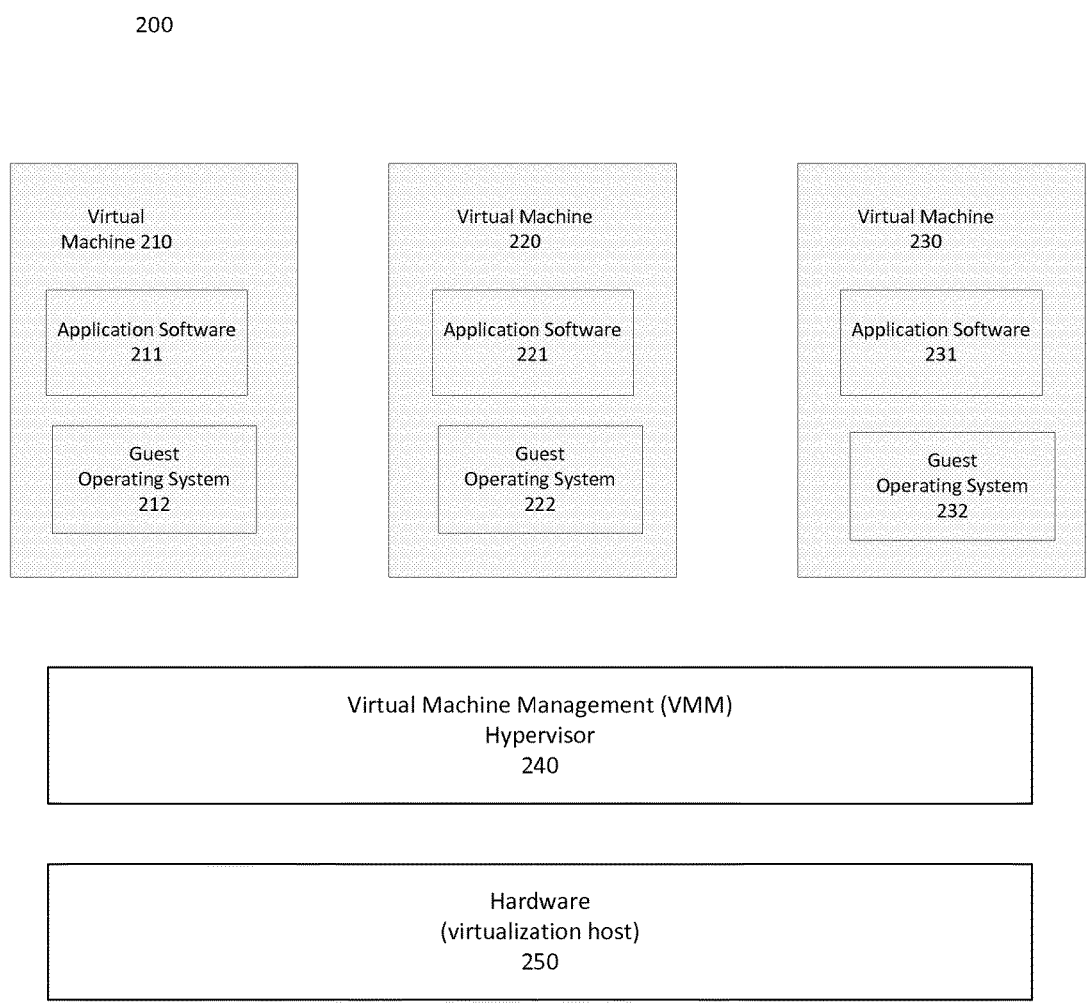
FIG. 2 is a block diagram illustrating an example embodiment of a hardware-based virtualization system.

FIG. 2 is a block diagram illustrating an example embodiment of a hardware-based virtualized system 200. In this embodiment, a single physical computer system 250 (also referred to as the virtualized host or hardware host) may contain one or more instantiations of virtual machines (VMs), such as VMs 210, 220 and 230. In this embodiment, the computer system 250 has a software layer called a hypervisor 240 installed thereon, which provides a virtualization platform and may be used to manage and monitor the one or more instantiations of VMs 210, 220 and 230 on the computer system 250. In this example, the hypervisor 240 is installed directly on the native hardware of the computer system 250; however, hypervisors may also be installed as a software layer in a native operating system, known as a host operating system.

In this embodiment, the hypervisor 240 has three instantiations of VMs 210, 220 and 230 installed thereon. Respective VMs have operating systems, such as guest operating systems 212, 222, and 232, and various program applications, such application software 211, 221 and 231. As described above, the operating systems 212, 222, 223 and applications 211, 221, 231 run substantially isolated from the other VMs co-located on the same physical computer system 250. Respective VMs 210, 220, and 230 communicate directly with the hypervisor 240, which in turn communicates with the respective VMs 210, 220 and 230.

Figure 3:
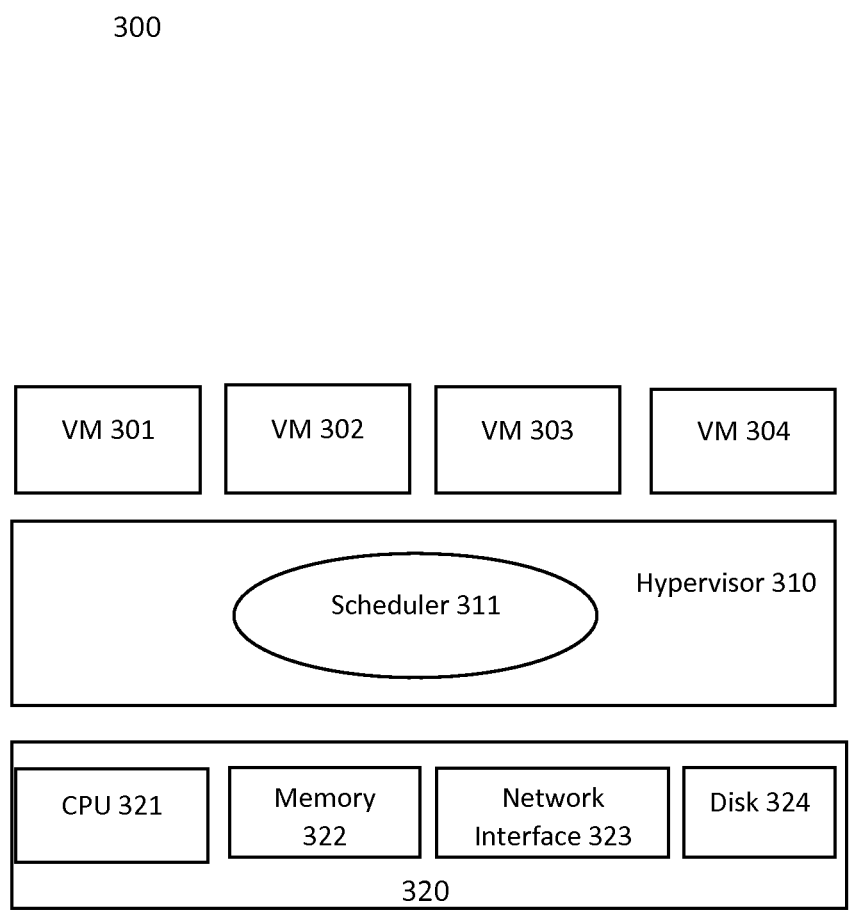
FIG. 3 is block diagram of a virtualized host with multiple VMs, according to an example embodiment.

FIG. 3 is block diagram of a hypervisor 310, according to an example embodiment. Hypervisor 310 is virtualization software that provides a simple user interface. Hypervisor 310 exists as a thin layer of software that handles hardware management functions to establish a virtualization management layer. Device drivers and system services are optimized for the provisioning of virtual servers or VMs. The virtualization layer is designed to communicate directly with the virtualized host 320, calling for all associated device drivers and support software to be compatible with hypervisor 310. This is often referred to as hardware-based virtualization.

The hypervisor 310 can be installed directly in the virtualized host 320 and provide features for controlling, sharing and scheduling the usage of hardware resources, such as processor power, memory, and I/O. These can appear to each virtual server's operating system as dedicated resources. CPU 321, memory 322, network interface 323 and disk 324 represent various components within virtualized host 320. The scheduler 311 is responsible for scheduling CPU resources for VMs 301, 302, 303, and 304. As more VMs share the same core/CPU 321, the CPU scheduling latency for each VM increases significantly. Such increase has a negative impact on the performance of TCP transport to the VMs 301, 302, 303 and 304.

Figure 4:
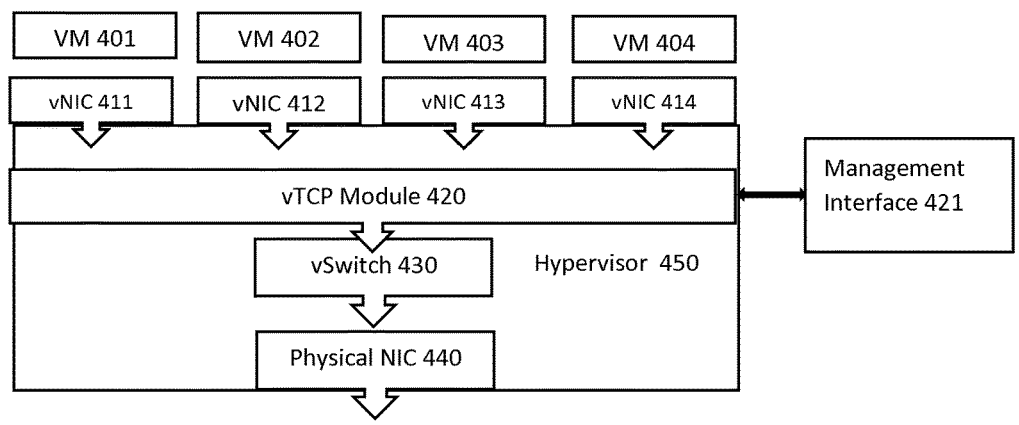
FIG. 4 illustrates an example embodiment of a hypervisor with a vTCP module.

FIG. 4 illustrates a block diagram of a hypervisor 410 which includes a vTCP module 420 for accelerating TCP performance between two hosts, according to various embodiments. The hypervisor 450 includes virtual NICs (referred to as vNICs), such as vNICs 411, 412, 413 and 414, that communicate with VMs 401, 402, 403 and 404. The hypervisor 450 includes a virtual switch (vSwitch), such as vSwitch 430, that communicates with a physical NIC 440 of the virtualized host (not shown). Also included in hypervisor 450 is a vTCP module 420. The vTCP module 420 is also referred to as a TCP acceleration module. In the embodiment shown in FIG. 4, the virtual data path includes vNICs 411, 412, 413 and 414, the vTCP module 420 and the vSwitch 430. In alternative embodiments, the vTCP module 420 can be located elsewhere along the virtual data path and is agnostic to the exact location. For example, vTCP module 420 can be located below vSwitch 430 without impacting the performance of hypervisor 450.

In example embodiments, the vTCP module 420 includes a local buffer (not shown) that is configurable and manageable through an outside management entity shown by a management interface 421. Examples of outside management entities include VMWare's vSphere or OpenStack's configuration platform. The vTCP module 420 improves TCP throughput in virtualized environments. The vTCP module 420 seamlessly plugs into a hypervisor 450, such as VMWare ESX, Xen, and KVM, and accelerates TCP connections without disrupting or needing cooperation from the end host TCP stack.

In various embodiments, the management interface 421 may provide a centralized way to administer, configure and control the behavior of TCP in a data center. For example, vTCP module 420 may provide several "tuning knobs" for controlling the various aspects of TCP. These tuning knobs represent adjustable protocol parameters or settings that may be configured to change the protocol behavior along a data path (or at least a portion of a data path between a protocol acceleration module and a protocol receiver. For example, when transmitting TCP packets between a TCP sender and a TCP receiver, the adjustable parameters or settings refer to one or more TCP values within the TCP header fields. The management interface 421 may include various input devices and/or user interfaces capable of receiving user input to modify the configurable protocol parameters. In further embodiments, the protocol configuration parameters or settings may be modified dynamically based on feedback from the protocol acceleration module, or another system capable of monitoring and evaluating the protocol behavior and performance along the data path between the protocol sender and protocol receiver.

In example embodiments, the management interface 421 creates the policy-based protocol stack configuration information (e.g., the policy-based TCP stack configuration information) by adjusting the protocol parameters or settings of the protocol stack configuration information of the protocol sender (e.g., TCP protocol sender). For example, the TCP data packets transmitted by the TCP sender include TCP header values from the TCP stack configuration information of the TCP sender. The policy-based TCP stack configuration information refers to the TCP stack configuration information created by the management interface, which is provided to the protocol acceleration module. The protocol acceleration module, in various embodiments, may override the TCP stack configuration information of the sender, while TCP data packets are transmitted between the protocol acceleration module and the TCP receiver. In further embodiments, the policy-based TCP stack configuration information may override the TCP stack configuration information of the sender without modifying the TCP stack configuration of the sender. One or more TCP header values may be overridden by modifying, adding, or deleting the TCP header values of the data packets transmitted between a portion of the data path between the protocol acceleration module and a TCP sender. In some embodiments, the one or more header values may be overridden for TCP data packets on a per flow basis or a per virtual machine basis. In other embodiments, the policy-based TCP stack configuration information represents flow classification information for organizing the data packets with different characteristics into different classes using certain criteria.

The tuning knobs, or configurable TCP parameters or settings, can be configured on a per-virtual machine and/or per-flow basis, where a flow can be any combination (including wild cards) of fields from the packet, including source IP address, destination IP address, ports and other protocol fields. In addition, the configured values of these knobs can be changed one or more times during the life-time of the TCP connection, for example, during the beginning of the connection, or for the first 1 megabyte (MB) of data transfer, or any such arbitrary period within the connection's lifetime. These tuning knobs allow modifying the behavior of TCP independently of how the TCP stack operates inside the virtual machine (e.g., guest operating system). Such flexibility is useful especially since operating systems use and publications/proposals (e.g., RFCs). Upgrading the TCP stack may not be an option since they may be running old applications, which are difficult to replace. It may be difficult even in situations where the infrastructure provider does not have control over the TCP behavior of the guest operating system.

In example embodiments, the various tuning knobs and settings provided by the vTCP module 420 may include, but are not limited to, congestion control algorithms knob(s), congestion control parameters knob(s), and (3) flow differential knobs. In alternative embodiments, configuring TCP control data or setting TCP parameters may be implemented using other forms of data input without using tuning knob(s).

For one embodiment, congestion control algorithm knob(s) or settings are used to apply different stock congestion control algorithms (e.g., Cubic, NewReno) with their standard settings for different flows/connection. Thus, the vTCP module 420 may provide a simple way to override the TCP connection behavior of the guest operations systems in a TCP stack, without any modifications to the guest operating system.

For other embodiments, congestion control parameter knob(s) or settings may be used to select different settings for various congestion control parameters such as initial congestion window, slow start threshold, rate at which the additive increase of the congestion window happens, the congestion window decrease factor upon encountering packet loss, and the duplicate ACK threshold for triggering fast retransmission. In an example embodiment, the initial congestion window which may be set to the default conservative value of 1, or 3, or the relatively more recently introduced value of 10 maximum segment size (MSS), or even something not specified in any IETF TCP specification or publication/proposal (e.g., RFCs). In another example embodiment, instead of the default action of reducing the congestion window by ½ whenever a packet loss is encountered, it could be set to ¾ to ensure that certain TCP connections stay aggressive.

In further embodiments, flow differentiation knob(s) or settings may be used to select different parameters for different TCP connections based on the overall network conditions according to a centrally defined policy, for example, to selectively favor certain real-time or deadline-oriented connections more than bulk-transfer oriented connections. For an example embodiment, the vTCP module 420 allows deviation from RFC-compliant settings for specific flows, such as those where both end-points of the TCP connection are inside the data center for which such deviation or experimentation is easily permissible. For other example embodiments, the client-facing or the public-Internet facing connections, standards-compliant TCP behavior may be exposed. In yet further embodiments, given that the protocol buffer in the vTCP module 420 is a scarce resource, allocation to those connections can be prioritized, providing beneficial additional buffer space.

In various embodiments, the vTCP module 420 may also assist in measurement and diagnostics of TCP connection problems in virtualized environments where scheduling may play a significant role in affecting TCP connections. For example, the vTCP module 420 can measure individual round-trip times (RTTs) from the Virtual Machine (TCP sender) to the vTCP module 420, and from the vTCP module 420 to the other end (TCP receiver). For example, with reference to FIG. 7, RTT is measured from the TCP sender 799 to the vTCP module 775, and from the vTCP module 775 to the TCP receiver 798.

This will help in understanding and diagnosing the connection when it experiences bad throughput. For example, evidence of high RTT between the VM and the vTCP module 420 will clearly indicate that the scheduling bubbles are causing significant dip in TCP performance, should that be empirically observed. In other examples, if the RTTs appear fine, then it is possible that there may be congestion inside the network causing bad throughput. Thus, diagnosis becomes easier with vTCP module 420. The vTCP module 420 could also measure and monitor many other common TCP connection characteristics, such as number of duplicate ACKs, number of duplicate packets, number of retransmissions, etc., that would allow system administrators, such as IT staff, to obtain TCP information in a centralized fashion. In example embodiments, the management interface 421 may be used to perform diagnostics, measurements and monitoring of TCP throughput and connection characteristics.

The vTCP module 420 provides improved TCP throughput between the TCP sender and receiver by accelerating the TCP processing. The vTCP module 420 runs inside hypervisor 450, which is either always scheduled (using a dedicated core for privileged hypervisor) or scheduled with priority. Since the basic time critical functions of TCP are implemented within vTCP module 420, TCP performance is improved significantly. In embodiments where there are sufficient hypervisor CPU cycles, full line rate for the TCP connection may be achieved.

Figure 5:
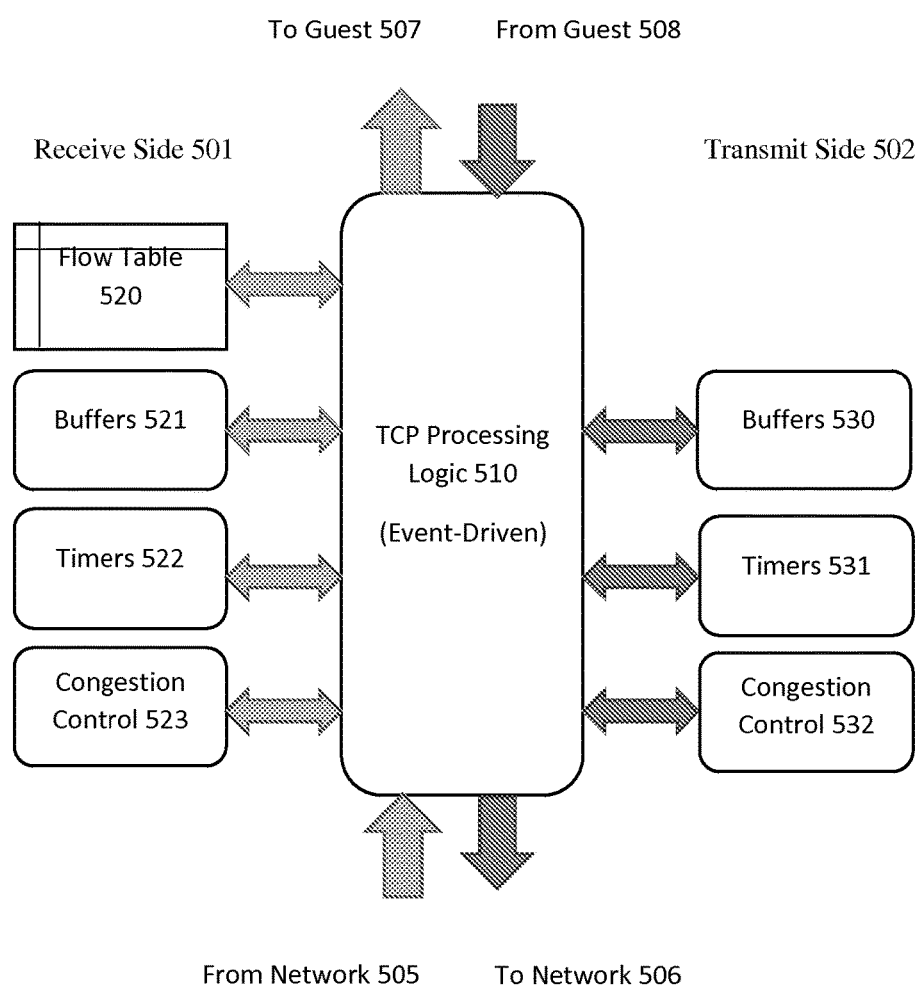
FIG. 5 illustrates a vTCP architecture according to a particular embodiment.

FIG. 5 illustrates a vTCP module 500 architecture according to a particular embodiment. For various embodiments, the vTCP module 500, also referred to as a protocol acceleration module, represents an in-band architecture. An in-band architecture relies on observing the TCP packets passing through vTCP module 500, and a guest TCP stack is not aware of the presence of the vTCP module 500. On the receive side 501, the TCP packets are sent from a network 505 to a guest 507. On the transmit side 502, TCP packets are sent from a guest 508 to a network 506. The in-band architecture of the vTCP module 500 provides accelerated TCP processing by signaling to the TCP sender to transmit more packets (via early acknowledgements) and implements full congestion control protocols.

The receive side 501 includes buffers 521, timers 522, and congestion control module 523. The transmit side 502 includes buffers 530, timers 531 and congestion control 532. Both the receive side 501 and the transmit side 502 share a flow table 520 since TCP is a full duplex protocol.

The receive-side buffers 521 hold all packets for each and every TCP connection that needs to be accelerated by vTCP module 500. Since no out-of-order packets are processed by the vTCP module 500, the buffers 521 contain only in-order segments or in-sequence data packets. The receive-side buffer 521 holds packets along the receive path (from the network 505 to the guest 507). The transmit-side buffers 530 are similar to the receive side buffers 521, except for the fact that the transmit-side buffers 530 apply to packets that are going from the guest 508 towards the network 506. Again, since only in-order segments are processed by the vTCP module 500, the buffers 530 will only store in-order packets. The fact that the buffers 530 consist of only in-order packets allows the buffer management functions and vTCP functions to be relatively lightweight. It is entirely possible, however, to add extra buffer space for out-of-order segments as a simple extension, particularly in the receive direction where the data center network may drop certain packets causing out-of-order packet arrival. On the transmit side 502, it is very unlikely that the VM will transmit out-of-order packets since the vNIC will cause back pressure all the way to the TCP socket in guest OS, causing no packet loss. Therefore, the transmit-side buffers 530 may not need to buffer these out of order packets, although buffering may be added if needed.

Retransmit timers are needed on both the transmit side 502 and the receive side 501 independently for retransmitting packets for which there is no acknowledgement received within a given duration of time or a timeout occurs. Timers 522 are on the receive side 501 and timers 531 are on the transmit side 502.

The TCP processing logic 510 is the central core logic for the vTCP module 500 and is event-driven in nature. In response to either ingress- or egress-direction packets, the logic 510 basically determines the actions corresponding to the processing.

The congestion control module 523 on the receive side 501 ensures that the shared buffer between the vTCP module and the TCP receiver inside the VM is not overwhelmed. It also recovers any packets that have been lost due to an overflow of the buffer between the vTCP module and TCP receiver inside the VM. Congestion control module 532 is on the transmit side 502 and applies a TCP standards-compliant congestion control algorithm (e.g., NewReno, Cubic) between the vTCP module 500 and a remote receiver. Both of the packet loss recovery algorithm/processing and the congestion control algorithm/processing are used to ensure packets that are lost along the receive path or the transmit path, respectively, are retransmitted.

The flow table 520 may store the TCP connection information and state (e.g., maximum size segment (MSS) value, various TCP options, and sequence number information) for each and every connection. In various embodiments, the TCP connection information and state for the TCP connections are defined by the data in one or more of the TCP header fields, which will be briefly described in the next paragraph below. In further embodiments, the flow table 520 may store additional TCP connection and state information which are not included in the data from the TCP header fields, such as location information for the copy of TCP data packets stored in the vTCP buffers 521. The flow table 520 may store common information used by both the receive side 501 and the transmit side 502. For an example embodiment, the per-flow TCP control information stored in flow table 520 includes: the sequence number of the in-sequence packet expected to be received by vTCP module 500, the sequence number of the in-sequence packet expected to be received by the VM, the TCP window size, the current mode of operation pass through or accelerated (also referred to as the slow path and fast path modes respectively), and the pointer to the vTCP buffer or protocol accelerator buffer (such as buffers 521 and 530) where TCP data packets are stored. The pointer provides location information for the TCP data packets having a copy stored in the vTCP buffer including the receive side buffers 521 and the transmit side buffers 530.

More specifically, the TCP data packets include a data section that follows the TCP header, which contains 10 mandatory fields, and an optional extension field. The data header fields include the following fields: Source Port (identifies the port number of a source application program); Destination Port (identifies the port number of a destination application program); Sequence Number (specifies the sequence number of the first byte of data in this segment); Acknowledgment Number (identifies the position of the highest byte received); Data Offset (specifies the offset of data portion of the segment); Reserved Code (for future use); Flag or Control Bits (9 1-bit flags to identify the purpose of the segment); Window (specifies the amount of data the destination is willing to accept); Checksum (verifies the integrity of the segment header and data); Urgent Pointer (indicates data that is to be delivered as quickly as possible); and Options (which includes (1) End of Options List—indicates end of the option list; (2) No Operation—indicates boundaries between options; (3) Maximum segment size (MSS)—maximum segment size TCP can receive, which is only sent in the initial connection request). The Control bits include the following 1-bit flags: URG (urgent pointer field is valid); ACK (Acknowledgment field is valid); PSH (Segment request a PUSH); RTS (Resets the connection); SYN (Synchronizes the sequence numbers); and FIN (sender has reached the end of its byte stream). Three additional 1-bit flags, which support explicit congestion notification (ECN) that allows end-to-end notification of network congestion without dropping packets, include: NS (ECN-nonce concealment protection); CWR (Congestion Window Reduce flag); and ECE (ECN-Echo indicates). The contents of the data section are the payload data carried for the application. The length of the data section is not specified in the TCP segment header; however, the length of the data section may be calculated by subtracting the combined length of the TCP header and the encapsulating IP header from the total IP datagram length (specified in the IP header).

Figure 6:
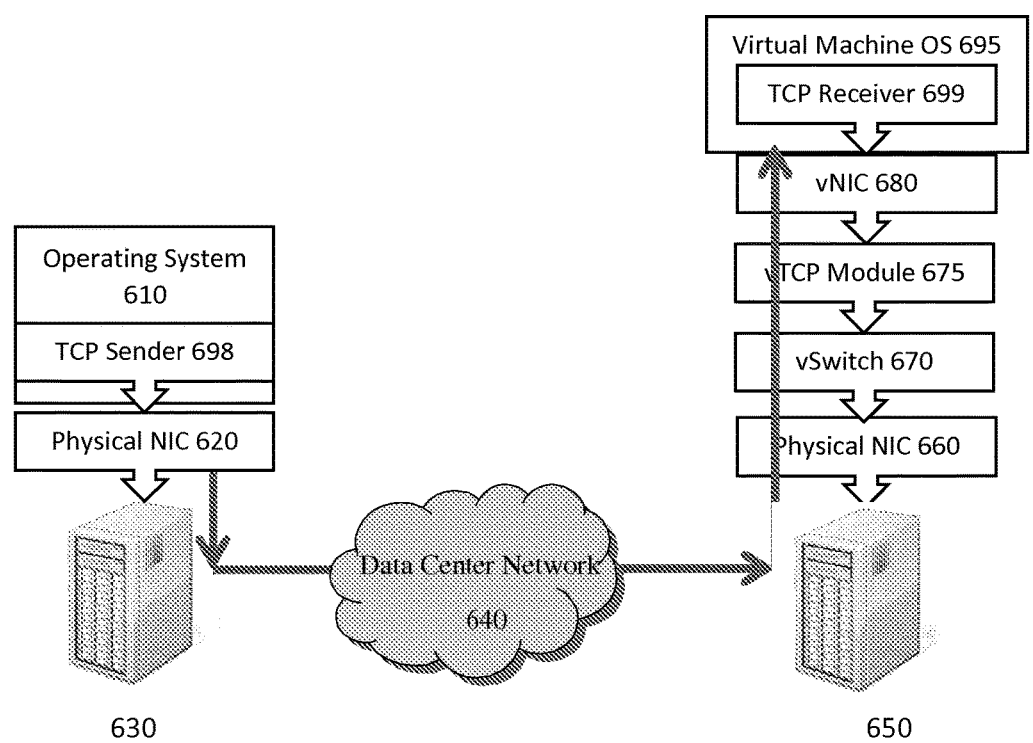
FIG. 6 illustrates a data path from a physical server to a virtual server, according to an example embodiment.
Figure 7:
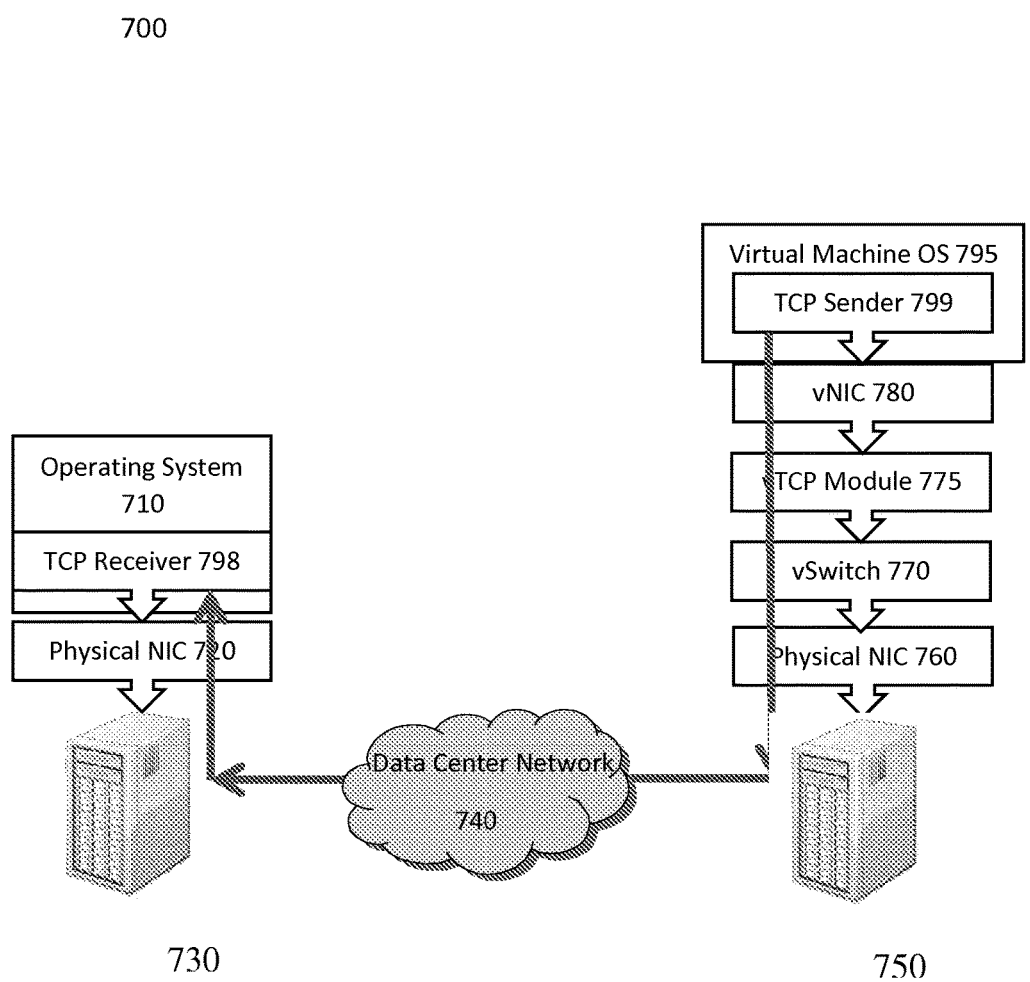
FIG. 7 illustrates a data path from a virtual server to a physical server, according to an example embodiment.

As mentioned above, the flow table 520 also stores TCP connection information and state for each and every connection. The various fields in the headers of the TCP packets contain TCP connection information and state information for the TCP packets. In various embodiments, the vTCP module 500 receives and stores a copy of the TCP packet data (in buffers 521 and/or flow table 520), and further allows changes to be made to the copy of the TCP header information stored in flow table 520, without altering the actual TCP packet data, which will be received by a TCP receiver, such as TCP receiver 699 (FIG. 6) or 798 (FIG. 7). For example, a TCP flow may include any combination of fields from the TCP packet data, including the source IP address included in the Source Port, the destination address included in the Destination Port, and any of the other data stored in the TCP header fields that may be configured on a per-virtual machine and/or per-flow basis anytime during the life-time of the TCP connection. This data, stored within vTCP module 500, may be referred to as configurable TCP control data. By enabling a system administrator of a system including a vTCP module 500 to configure the TCP control data, the behavior of TCP may be modified independently of how the TCP stack operates inside a virtual machine (VM) guest operating system (e.g., guest operating systems 212, 222, or 232). Such flexibility may be useful especially in situations where operating systems use TCP settings that are quite conservative and based on the IETF old publications and/or proposals (e.g., RFCs) that may or may not get adopted as internet standards. Upgrading the TCP stack may not be an option since a system may be running old applications, which are difficult to replace. It may be difficult even in situations where the infrastructure provider does not have control over the TCP behavior of the guest operating system. For example embodiments, a system administrator or IT staff may configure TCP control data via the management interface 421, shown in FIG. 4.

The vTCP module 500 performs fast path (or accelerated) TCP processing between two hosts. Fast path processing usually dominates over slow path processing. Fast path processing refers to the TCP processing of in-sequence packets when the vTCP buffer has enough space to store the in-sequence packet being transmitted from the TCP sender to the TCP receiver. Fast path for accelerating TCP processing is performed by having vTCP module 500 take over certain responsibilities of the TCP processing from one of the hosts without changing TCP protocol processing and semantics at either host. In various embodiments, either the TCP sender or the TCP receiver is inside a virtual machine. The other end of the TCP may be either a physical or virtual system. Throughout this specification, the receive data path, as shown in FIG. 6, refers to the case where TCP receiver is inside the VM, and the transmit data path, as shown in FIG. 7, refers to the case where the TCP sender is inside a VM. TCP throughput between hosts is improved with accelerated fast path processing because the vTCP module takes over responsibility for many TCP functions such as acknowledgement generation, packet retransmission, flow control, congestion control, etc.

FIG. 6 illustrates an embodiment of a data path 600 from a TCP sender 698 to a TCP receiver 699 and is referred to as the receive side. In this embodiment, the TCP sender 698 is inside a physical server 630 and the TCP receiver 699 is inside a VM 650. For an alternative embodiment, physical sever 630 may be replaced with a virtual server. TCP connection is managed by an operating system through a programming interface that represents the local end-point for communications, the Internet socket. The TCP sender 698 within operating system 610 transmits a data packet through physical NIC 620 of a physical server 630, through data center network 640, to a physical NIC 660 of a VM 650, where it is transmitted through vSwitch 670, vTCP module 675 (for fast path accelerated TCP processing), vNIC 680, to TCP receiver 699 within VM OS 695.

In the receive direction, a TCP sender 698, either inside a physical machine or a physical server 630, transmits data packets towards a TCP receiver 699 that resides within a virtual machine OS 695. Here, most data packets are transmitted towards the VM OS 695, while TCP acknowledgement packets are transmitted from the TCP receiver 699 to the TCP sender 698. As shown in FIG. 6, the vTCP module 675 lies between the TCP receiver 699 in the VM OS 695 and the physical NIC 660. The exact location where the vTCP module 675 needs to be present may vary, and the architecture and solution of the various embodiments is agnostic to the exact location. For example, vTCP module 675 may be positioned below the vSwitch 670.

The various steps involved in the TCP processing at the receive side, including the specific steps taken by the vTCP module 675 for acceleration, are described below. The TCP sender 698 initiates a TCP session with the TCP receiver 699 using the standard 3-way handshake. During the basic TCP 3-way handshake step, the vTCP module 675 observes all packets being sent between the TCP sender 698 and the TCP receiver 699 in both directions and keeps track of the initial sequence number and other details of the TCP session. The vTCP module 675 will also parse TCP options to figure out whether options such as DSACK and timestamps are enabled, and also note the window scale factor used.

The TCP sender 698 starts sending data packets towards the TCP receiver 699. If the vTCP module 675 observes packets in-sequence, it will make a copy of the packet within a local buffer and generate an early acknowledgement on behalf of the target TCP receiver 699. The local buffer lies within the vTCP module 675 and is configurable and manageable through an outside management entity, as shown by management interface 421 in FIG. 4. The local buffer may be referred to as the protocol accelerator buffer. The vTCP module 675 internally manages the protocol accelerator buffer to keep track of packets. For various embodiments, the vTCP module 675 includes packet loss recovery processing. Based on acknowledgements (or lack thereof) from the TCP receiver 699 (also referred to as "receiver acknowledgements"), the vTCP module 675 determines whether to retransmit packets. In order to retransmit packets, a copy of the packets are stored in the vTCP module 675 in a local buffer referred to as the protocol accelerator buffer. If the receiver acknowledgements are not received within a timeout period, potentially because of packet loss, the packet loss recovery processing will ensure retransmission of these packets.

Once the target TCP receiver 699 receives the data packets, it will also generate acknowledgements corresponding to these packets. Since these data packets have already been acknowledged by the vTCP module 675 during the early acknowledgement process, these acknowledgements are intercepted by the vTCP module 675 and are dropped.

The duplicate acknowledgement generation, for packets that have already been acknowledged before, is done by the vTCP module 675 for packets coming in from the TCP sender 698 just like a regular TCP receiver 699 would. If a duplicate packet arrives for which there is already a copy in the local buffer, vTCP module 675 it would just drop the packet.

Since the vTCP buffer is a limited resource, it may become full, particularly if the TCP receiver 699 is slow to accept packets. In such a case, the vTCP module 675 enters an "OFF" state where by it does not generate any early acknowledgements for any data packets coming from the TCP sender 698. It just passes these packets through to the VM 650 to give the control back to the end hosts. In an alternative approach, the vTCP module 675 could modify the receive window advertised by the receiver 699 to factor in the occupancy of the buffer resources, so that the sender 698 never transmits segments that are outside the window.

Once buffer space opens up, again, the vTCP module 675 it starts the early acknowledgement process for any data packets in order. If packets arrive out of order, the vTCP module 675 shuts itself "OFF" and lets the VM 650 handle these packets. In other words, any slow path processing that is needed is handled by the VM's TCP receiver 699. Only fast path processing, which usually dominates the lifetime of a given TCP connection, is handled by the vTCP module 675.

The vTCP module 675 also maintains a timer to retransmit a packet from the buffer to the TCP receiver 699 after a timeout period has expired. Retransmits are important since it is not guaranteed that a packet that is buffered in the vTCP module 675 after passing the packet along will be received by the TCP receiver 699. It could be that the shared buffer between the host/guest may be full, in which case the packet may be dropped.

If there is no acknowledgement back from the TCP receiver 699 corresponding to a packet sent before, the vTCP module 675 uses a simple retransmission algorithm (e.g., keep doubling the retransmit timer) and retransmits again at regular intervals for a certain number of times. This approach ensures that if packets have been early acknowledged, the vTCP module 675 retains responsibility to ensure the target TCP receiver 699 eventually gets these packets. Alternately, the vTCP module 675 may also use a full-fledged congestion control algorithm similar to what TCP uses today to ensure network resources are not overly congested. For example, standard congestion control algorithms may be implemented such as New Reno, Cubic. In addition, newer variants of congestion control algorithms may be implemented, which are in the broad category of additive increase multiplicative decrease (AIMD) algorithms, but different variants from those proposed in the standards. For example, in standard congestion control algorithms, on discovering a packet loss episode, the protocol reduces the congestion window typically by half. We could reduce the congestion window by a different factor, such as ¾ instead of half, so that the backoff is not as aggressive as the standard TCP algorithm.

The vTCP module 675 provides fine-grained control to determine which TCP connections need better quality of service (QoS) and prioritize the downstream resources (from the vTCP module 675 to the TCP receiver 699) across different connections that share them. In the default mode, we provide fair access to the buffer resources for all connections. However, in alternative embodiments, the default mode may be modified, as needed, for a particular network. For example, one connection could be given lot of buffer, while another could be given less buffer and some other connection zero buffer space.

FIG. 7 illustrates an embodiment of a data path 700 from a TCP sender 799 to a TCP receiver 798 and is referred to as the transmit side. In this embodiment, the TCP sender 799 is inside a virtualized host 750 and the TCP receiver 798 is inside a physical server 730. For an alternative embodiment, physical sever 730 may be replaced with another virtual server. The TCP connection is managed by an operating system through a programming interface that represents the local end-point for communications, the Internet socket. The TCP sender 799 resides within operating system 795, transmits a data packet through vNIC 780 of the virtualized host 750 having vTCP module 775 and vSwitch 770, through data center network 740, to a physical NIC 720 of a server 730, where it is received by a TCP receiver 698 residing within OS 710.

The TCP receiver 798 may be present either within a physical server 730 (as shown in the figure) or even a virtual server. The various steps involved in the TCP processing in the receive side, including the specific steps taken by the vTCP module 775 for acceleration, are described below.

The TCP sender 799 initiates a TCP session with the TCP receiver 798 using the standard 3-way handshake. During the basic TCP 3-way handshake step, the vTCP module 775 observes all packets between the TCP sender 799 and TCP receiver 798 in both directions and keeps track of the initial sequence number and other information for the TCP session. The vTCP module 775 will also parse TCP options to figure out whether options such as DSACK and timestamps are enabled and also the window scale factor. The vTCP module 775 will keep track of these session parameters locally for this session in a flow table, such as flow table 520 shown in FIG. 5.

The TCP sender 799 starts sending data packets towards the TCP receiver 798. If the vTCP module 775 observes packets "in order", it will make a copy of the packet within a local buffer, such as buffers 530 (FIG. 5) and generate an early acknowledgement back to the TCP sender 799. The local buffer lies within the vTCP module 775 and its size is configurable through an outside management entity such as VMWare's vSphere or OpenStack's configuration platform, as shown by the management interface 421 in FIG. 4.

The TCP receiver 798 will eventually generate acknowledgements corresponding to these data packets once it receives them. These acknowledgements are intercepted by the vTCP module 775 and are dropped by the vTCP module 775 if the acknowledgements were already generated by the early acknowledge module.

The duplicate acknowledgement generation, for packets that have already been acknowledged before, is done by the vTCP module 775 for packets coming in from the TCP sender 799 side just like a regular TCP receiver 798 would. If a duplicate packet arrives for which there is already a copy in the vTCP buffer, the vTCP module 775 just drops the packet.

Since the vTCP buffer is a limited resource, it may become full, particularly if the TCP receiver 798 is slow to accept packets. In which case, the vTCP module 775 enters an "OFF" state where by it does not generate any early acknowledgements for any data packets coming from the TCP sender 799. It just passes these packets through to the VM to give the control back to the end hosts. Once buffer space opens up, again, the vTCP module 775 starts the early acknowledgement process for any data packets in order.

Alternately, the vTCP module 775 may modify the window size to reflect the buffer resources in the vTCP module 775 to the TCP sender 799 to effectively perform "flow control".

If packets arrive out of order, the vTCP module 775 shuts itself "OFF" and lets the VM handle these packets. In other words, any slow path processing that is needed is handled by the VM's TCP sender 799. Only fast path processing, which arguably dominates the lifetime of a given TCP connection, is handled by the vTCP module 775.

The vTCP module 775 implements TCP's full congestion control protocol, which involves monitoring the congestion window increase and decrease semantics. Any available TCP congestion control protocol (such as TCP Bic/Cubic, High Speed TCP, Reno) may be emulated inside the vTCP module 775. It also maintains timers to retransmit packets from the buffer to the TCP receiver 798 should an acknowledgment not be received within a given time. Retransmits are important since it is not guaranteed that a packet that is buffered in the vTCP module 775 after passing the packet along will be received by the TCP receiver 798. It could be that the network may drop the packet, in which case it needs to be retransmitted.

TCP provides a connection-oriented, reliable, byte stream service. TCP transfers a contiguous stream of bytes by grouping the bytes in TCP segments, which are passed to IP for transmission from a TCP sender to TCP receiver. The term "TCP packets" and "data packets" described herein refers to the TCP segments passed to IP for transmission between the protocol sender and receiver (such as the TCP sender and the TCP receiver, respectively). The TCP sender assigns a sequence number to each byte transmitted, and expects a positive acknowledgment back from the TCP receiver. The sequence number provides information as to whether bytes received are in-sequence or out-of-order. In general, if a positive acknowledgment is not received within a timeout interval, or timeout period, the data is retransmitted. TCP also implements flow control, such as a sliding window, to prevent the overflow of the TCP receiver's buffers. The TCP receiver sends an acknowledgement back to the TCP sender, which indicates to the TCP sender the number of bytes it may receive beyond the last received TCP segment, without causing an overflow of the TCP receiver buffers.

Figure 9:
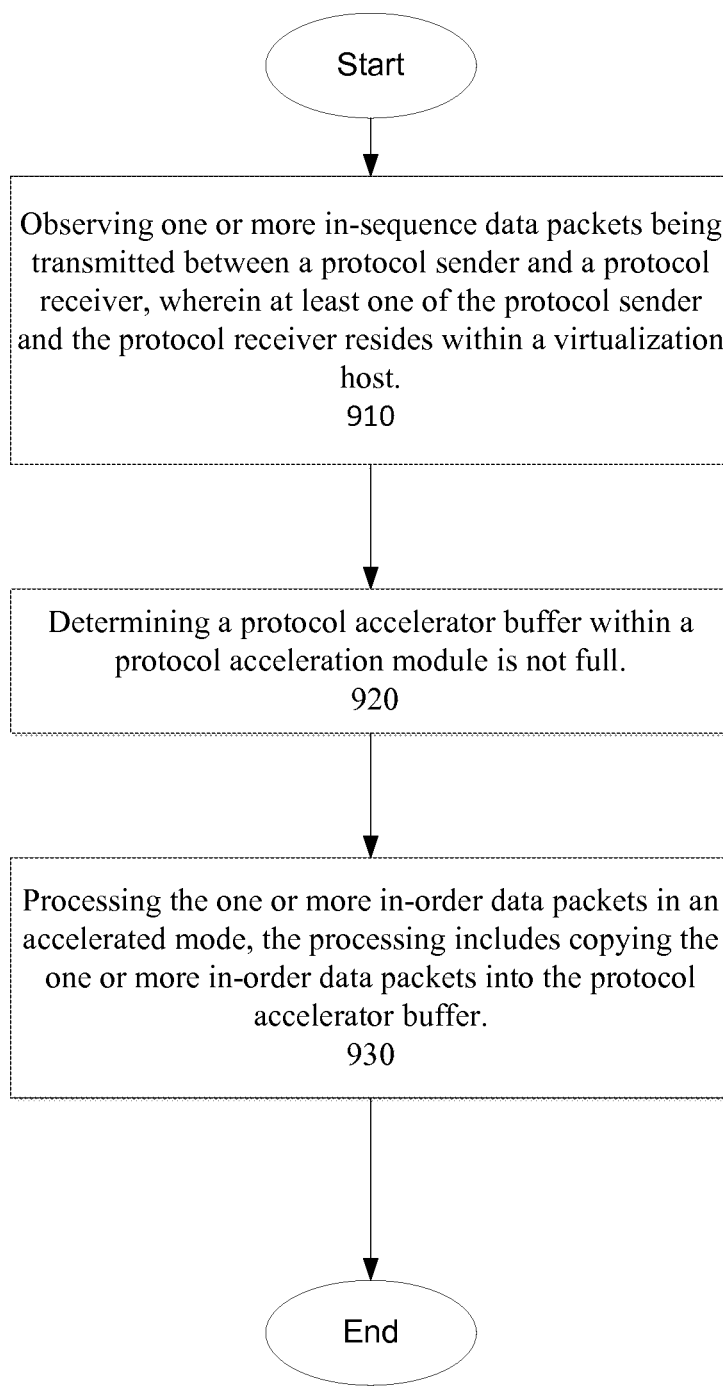
FIG. 9 is a processing flow chart illustrating an example embodiment of a method for accelerated protocol processing between a protocol sender and a protocol receiver.

FIG. 9 is a processing flow chart illustrating an example embodiment of a method for accelerated protocol processing between a protocol sender and a protocol receiver. In an example, method 900 includes observing in-sequence data packets being transmitted between a protocol sender and a protocol receiver where at least one of the protocol sender and the protocol receiver resides within a virtualized host, at operation 910. For alternative embodiments, both the protocol sender and receiver reside within a virtualized host. A determination is made that a protocol packet buffer within a protocol acceleration module is not full at operation 920. The processing of the in-sequence data packets in an accelerated mode of operation occurs only when the data packets, such as TCP data packets, are in-sequence (as inferred from the sequence number) and the protocol packet buffer is not full. At operation 930, the in-sequence data packets are processed in an accelerated mode of operation and copied into the protocol packet buffer. The in-sequence data packets are copied into the protocol packet buffer before being passed through to the protocol receiver. This allows the protocol accelerator module to implement a packet loss recovery process if an in-sequence data packet is potentially lost.

For various embodiments, processing the one or more in-sequence data packets includes an early acknowledgement and packet loss recovery process, while implementing flow control and congestion control processes. An example embodiment uses the protocol acceleration modules to accelerate TCP/IP protocol processing between a TCP sender and a TCP receiver.

Figure 10:
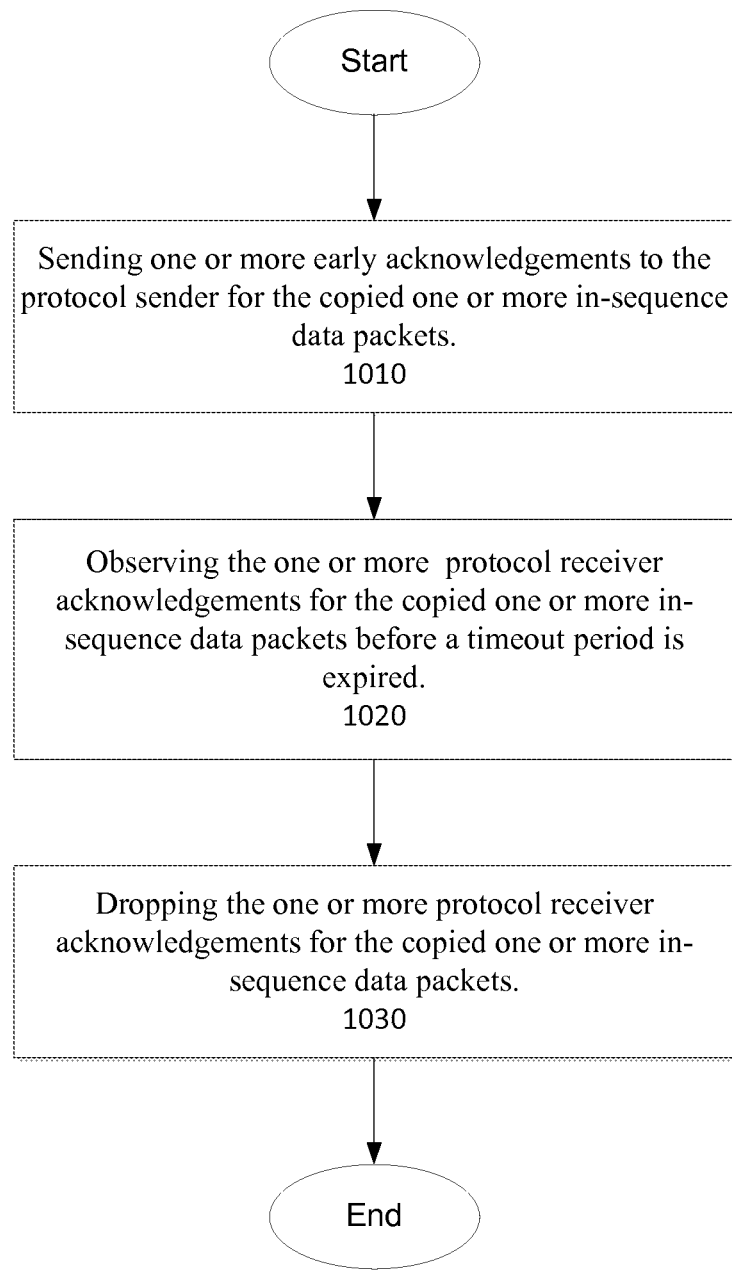
FIG. 10 is a processing flow chart illustrating an example embodiment of a method for early acknowledgement protocol processing.

FIG. 10 is a processing flow chart illustrating an example embodiment of a method for early acknowledgement protocol processing. In an example, method 1000 includes sending one or more early acknowledgements to the protocol sender for the copied one or more in-sequence data packets at operation 1010; observing the one or more protocol receiver acknowledgements for the copied one or more in-order data packets before a timeout period is expired at operation 1020; and dropping the one or more protocol receiver acknowledgements for the copied one or more in-sequence data packets at operation 1030. The early acknowledgement process signals the TCP sender to continue sending data packets before the actual acknowledgement from the TCP receiver (also referred to as protocol receiver acknowledgement) to accelerate the sending of data packets and TCP processing.

Figure 11:
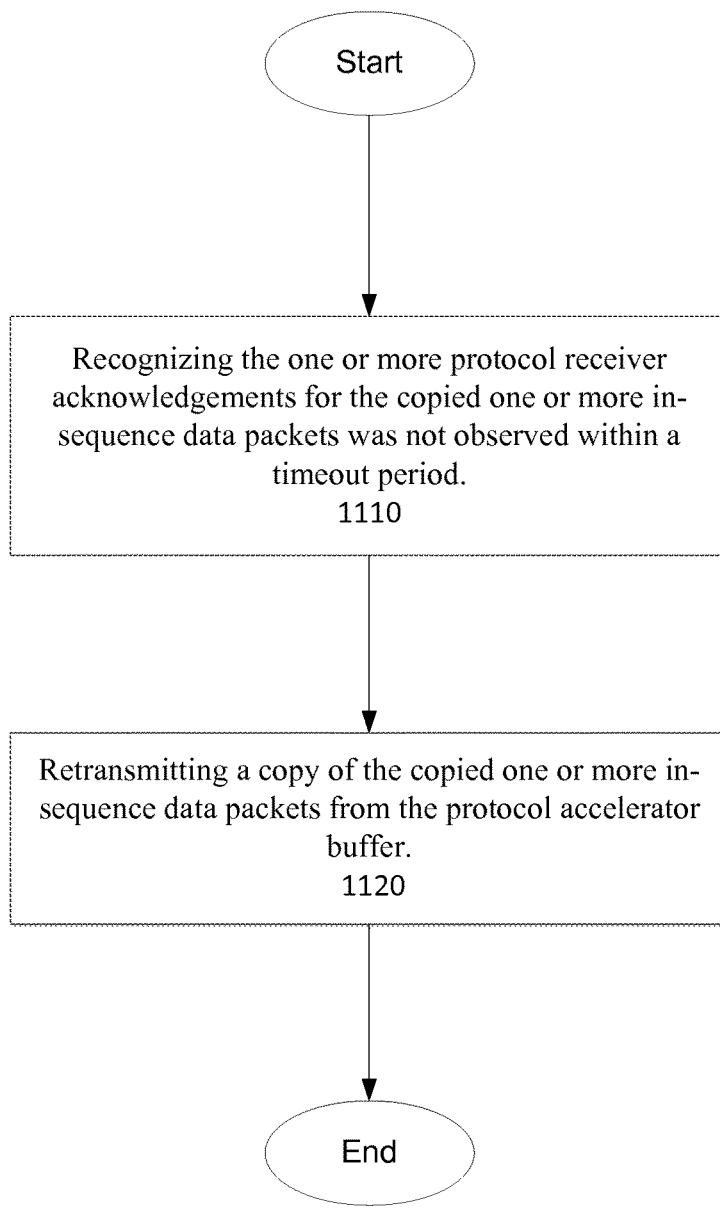
FIG. 11 is a processing flow chart illustrating an example embodiment of a method for packet loss recovery protocol processing.

The protocol acceleration module, such as vTCP module 500 of FIG. 5, is responsible for ensuring the data packets that it has provided with early acknowledgments actually are received by the TCP receiver. FIG. 11 is a processing flow chart illustrating an example embodiment of a method for packet loss recovery protocol processing. In an example, method 1100 includes recognizing the one or more protocol receiver acknowledgements for the copied one or more in-sequence data packets was not observed within a timeout period at operation 1110; and retransmitting a copy of the copied one or more in-sequence data packets from the protocol packet buffer at operation 1120.

Figure 12:
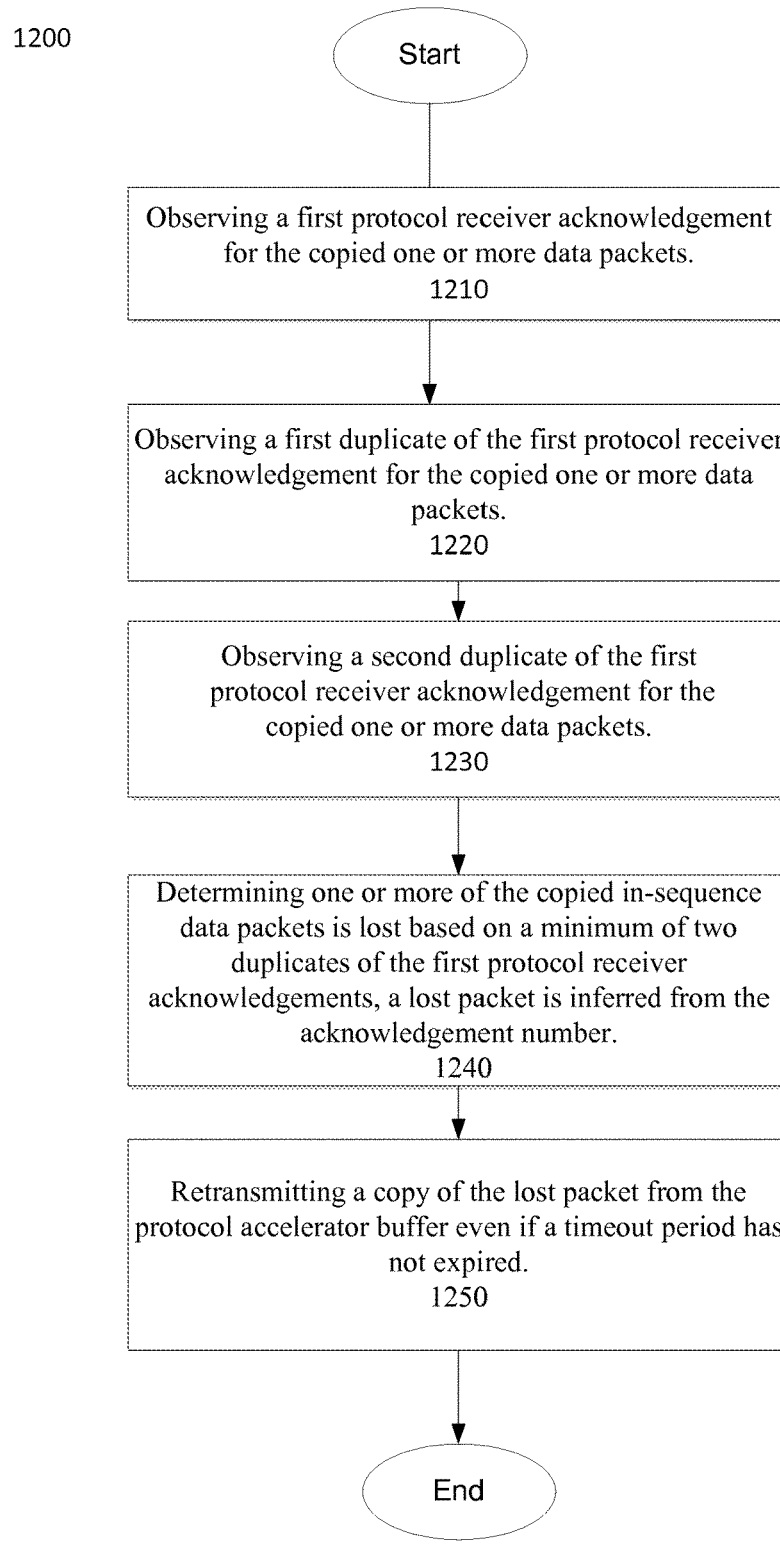
FIG. 12 is a processing flow chart illustrating an example embodiment of a method for packet loss recovery protocol processing for duplicative acknowledgements.

FIG. 12 is a processing flow chart illustrating an alternative embodiment of a method for packet loss recovery protocol processing for duplicate acknowledgments received from the TCP receiver. In an example, method 1200 includes observing a first protocol receiver acknowledgement for the copied one or more data packets at operation 1210; observing a first duplicate of the first protocol receiver acknowledgement for the copied one or more data packets at operation 1220; observing a second duplicate of the first protocol receiver acknowledgement for the copied one or more data packets at 1230; determining one or more of the copied in-sequence data packets is lost: based on a minimum of one duplicate of the first protocol receiver acknowledgements, a lost packet is inferred from the acknowledgement number at operation 1240; and retransmitting a copy of the lost packet from the protocol packet buffer even if a timeout period has not expired at 1250.

For various embodiments, the flow control protocol processing implements a sliding window flow control protocol. For example, when the sliding window flow control protocol is implemented for TCP, the 16 bit window size field in the TCP header is used to specify the number of window size units (e.g., in bytes). This value indicates the amount of additionally received data (in bytes) that a TCP receiver is willing to buffer for the connection, and thus the TCP sender may only send up to that amount of data before it is required to wait for an acknowledgement from the TCP receiver. When a TCP receiver advertises a window size of 0, the TCP sender stops sending data until it receives an updated window size value for the TCP receiver.

Figure 13:
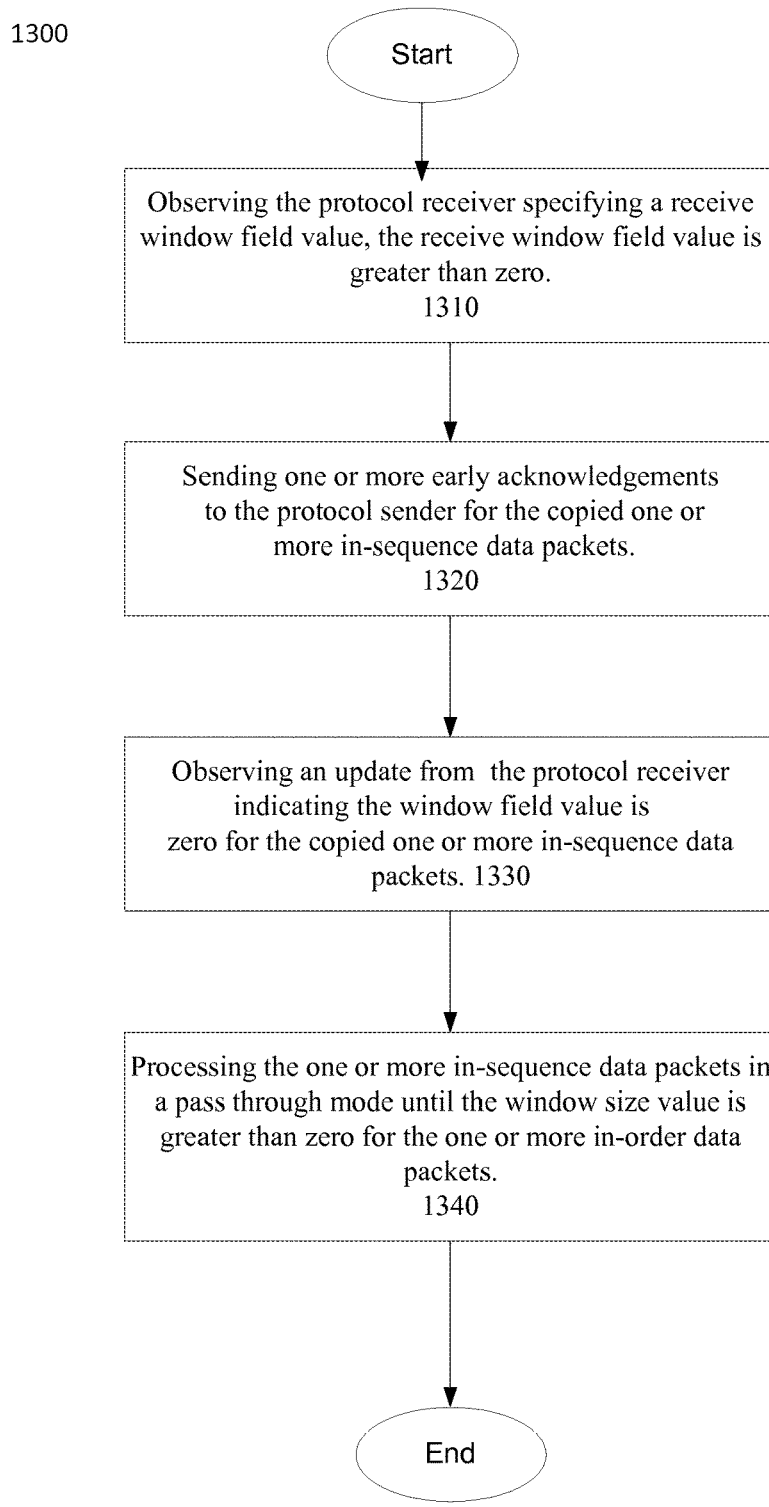
FIG. 13 is a processing flow chart illustrating another example embodiment of a method for flow control protocol processing.

FIG. 13 is a processing flow chart illustrating another example embodiment of a method for flow control protocol processing. In an example, method 1300 includes observing the protocol receiver specifying a receive window field value greater than zero at operation 1310; sending one or more early acknowledgements to the protocol sender for the copied one or more in-sequence data packets at operation 1320; observing an update from the protocol receiver indicating the window field value is zero at operation 1330; and processing the one or more in-sequence data packets in a pass through mode until the window size value is greater than at operation 1340.

Due to network congestion, traffic load balancing, or other unpredictable network behaviors, IP packets may be lost, duplicated, or delivered out-of-order. TCP detects these problems, requests retransmission of lost data, rearranges out-of-order data, and even helps to minimize network congestion. Various embodiments described herein may implement one or more of the following TCP data packet processes described above related to the reliable transfer of TCP data packets with the use of a vTCP module, also referred to as protocol acceleration module.

Example embodiments described herein provide systems and methods for transmitting data packets between a protocol sender and a protocol receiver in a cloud environment, having either the protocol sender or the protocol receiver residing within a virtualized host. For one embodiment, the data packets transmitted may be TCP data packets such that the protocol senders and receivers may be TCP protocol senders and receivers. A protocol acceleration module (also referred to as a vTCP module or TCP acceleration module in various embodiments), may be installed and maintained anywhere along the data path from the protocol sender/receiver within the guest OS to the physical NIC. For some embodiment, the protocol acceleration module may plug into or be integrated within a hypervisor. The protocol acceleration module may observe the data packets transmitted along the data path between the protocol sender and the protocol receiver using protocol stack configuration information (e.g., TCP stack configuration information) of the protocol sender (e.g., TCP sender). The protocol acceleration module may override the protocol stack configuration information with policy-based protocol stack configuration information (e.g., policy-based TCP stack configuration information) such that data packets transmitted from the protocol acceleration module to the protocol receiver use the policy-based protocol stack configuration information. For various embodiments, the protocol stack configuration information of the protocol sender is not modified.

In further embodiments, the policy-based protocol stack configuration information is created at a management interface of a system. The management interface may be an outside management entity used to configure and manage the protocol acceleration module. The management interface may provide a centralized way to administer, configure and control the behavior of internet protocols (such as TCP) in a data center. For example embodiments, the management interface may include various input devices and user interfaces capable of receiving user input (such as a data center administrator) to adjust or modify the protocol configuration parameters or settings. In further embodiments, the protocol configuration parameters or settings may be modified dynamically based on feedback from the protocol acceleration module, or other system capable of monitoring and evaluating the protocol behavior and performance along the data path between the protocol sender and protocol receiver.

In various embodiments, the protocol configuration parameters may be configured on a per-virtual machine basis and/or per-flow basis. In one example a data flow is defined as any combination of fields within the data packets. In other examples, multiple virtual machines may be managed and configured using a management interface by a user (such as a data center administrator). In other embodiments, the outside management entity provides the policy-based protocol configuration information to the protocol acceleration module such that data packets transmitted from the protocol acceleration module to the protocol receiver use the policy-based protocol stack configuration information without modifying the protocol stack configuration information of the protocol sender.

Figure 14:
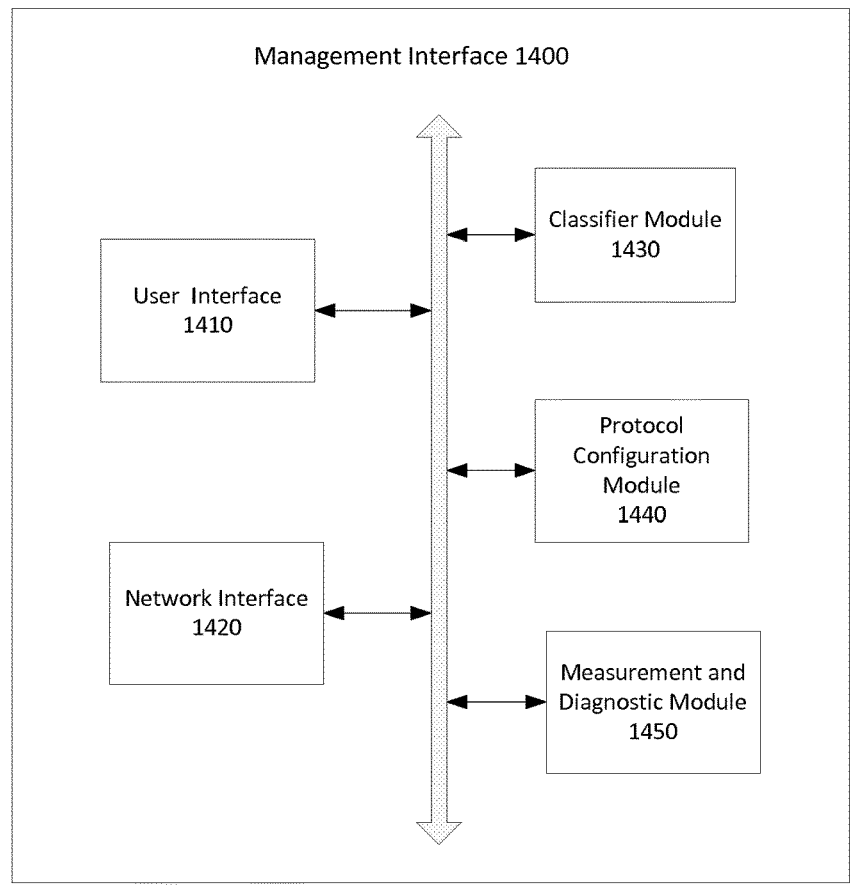
FIG. 14 is a block diagram illustrating an example embodiment of a management interface.

FIG. 14 is a block diagram illustrating an example embodiment of a management interface. A management interface 1400 may represent the management interface 421, shown in FIG. 4, in one embodiment. The management interface 1400 includes a user interface 1410, network interface 1420, a classifier module 1430, a protocol configuration module 1440 and a measurement and diagnostics module 1450 in one embodiment. The network interface 1420 includes a transmitting module (not shown) and receiving module (not shown), and is configured for sending and receiving configuration information (e.g., policy-based configuration information) and diagnostic information (e.g., measurement information, diagnostic information, etc.). All of the modules may communicate with each other, for example, via a network coupling, shared memory, and the like. It will be appreciated that each module may be implemented as a single module, combined into other modules, or further subdivided into multiple modules. Other modules not pertinent to example embodiments may also be included, but are not shown. In alternative embodiments, one or more modules shown in the management interface 1400 may not be used.

In an example embodiment, the protocol configuration module 1440 is configured to create policy-based TCP stack configuration information for a plurality of data flows for transmitting a plurality of data packets between a protocol sender and a protocol receiver over a portion of the data path between a protocol acceleration module and the protocol receiver. While transmitting the plurality of data packets, the TCP stack configuration information of the protocol sender is not modified. At least one of the protocol sender and the protocol receiver resides within a virtualized host. In one example embodiment, TCP sender 698 transmits data packets to TCP receiver 699 through vTCP module 675 (shown in FIG. 6). In another example embodiment, TCP sender 799 transmits data packets to TCP receiver 798 through vTCP module 775 (shown in FIG. 7). A transmitting module (not shown), located within a network interface 1420, is configured to provide the policy-based configuration information to at least one protocol acceleration module.

In an alternative embodiment, at least one of the protocol configuration module 1440 and the transmitting module is included within the management interface 1400. In a further embodiment, the protocol configuration module 1440 is configured to create the policy-based configuration information to modify behavior of TCP protocols of the plurality of data flows for a plurality of virtual machines (e.g., virtual machines 210, 220 and 230 shown in FIG. 2). In another embodiment, the management interface 1400 is configured to provide the policy-based configuration information to at least one protocol acceleration module to configure at least one of a plurality of virtual machines (e.g., virtual machines 210, 220 and 230 shown in FIG. 2) with the policy-based configuration information.

Figure 15:
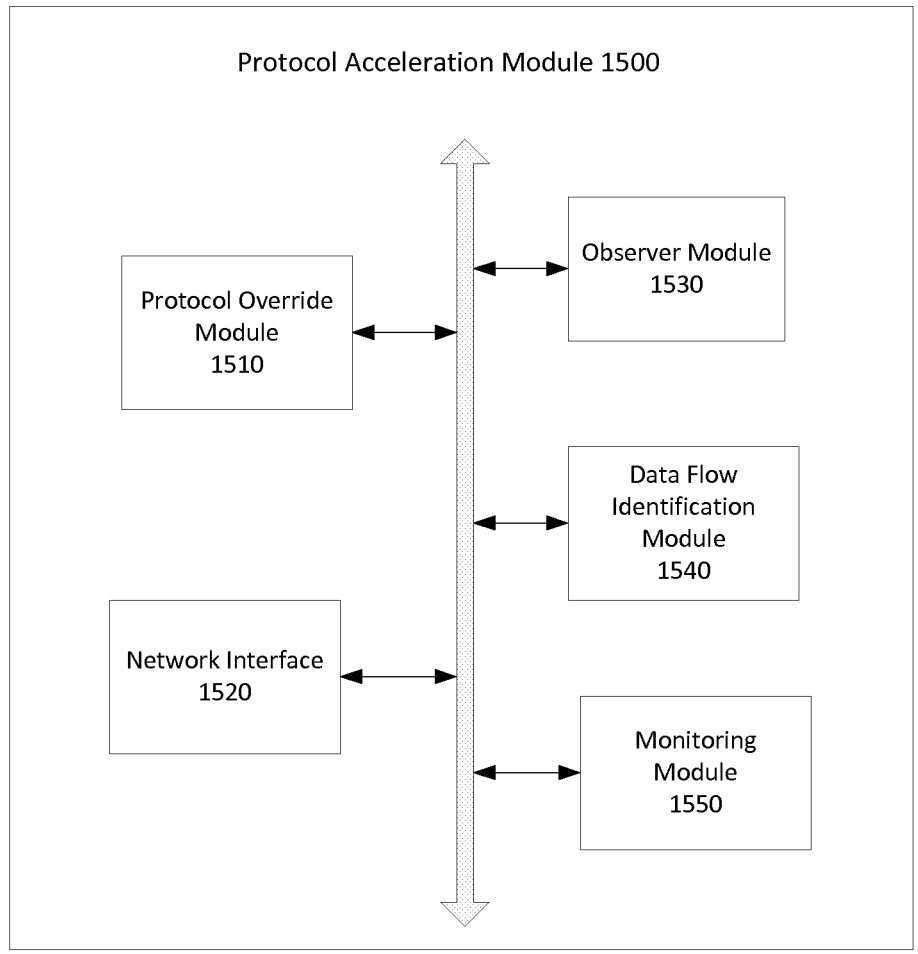
FIG. 15 is a block diagram illustrating an example embodiment of a protocol acceleration module.

FIG. 15 is a block diagram illustrating an example embodiment of a protocol acceleration module 1500. Protocol acceleration module 1500 may include a protocol override module 1510, a network interface 1520, an observer module 1530, a data flow identification module 1540 and a monitoring module 1550 in one embodiment. Protocol acceleration module 1500 may represent the vTCP module 420 (shown in FIG. 4), vTCP module 500 (shown in FIG. 5), vTCP module 675 (shown in FIG. 6) vTCP module 775 (shown in FIG. 7) in various embodiments. The network interface 1520 includes a transmitting module (not shown) and receiving module (not shown), and is configured for sending and receiving data packets, configuration information, and diagnostic information. All of the modules may communicate with each other, for example, via a network coupling, shared memory, and the like. It will be appreciated that each module may be implemented as a single module, combined into other modules, or further subdivided into multiple modules. Other modules not pertinent to example embodiments may also be included, but are not shown. In alternative embodiments, one or more modules shown in the protocol acceleration module 1500 may not be used.

In an example embodiment, the observer module 1530 is configured to observe the data flows for transmitting data packets between a protocol sender and a protocol receiver using TCP stack configuration information of the protocol sender. At least one of the protocol sender and the protocol receiver resides within a virtualized host. In one example embodiment, TCP sender 698 transmits data packets to TCP receiver 699 through vTCP module 675 (shown in FIG. 6). In another example embodiment, TCP sender 799 transmits data packets to TCP receiver 798 through vTCP module 775 (shown in FIG. 7). The data flow identification module 1540 is configured to identify the policy-based TCP stack configuration information for the data flows. The protocol override module 1510 is configured to override, between the protocol acceleration module 1500 and the protocol receiver, the TCP stack configuration of the of the protocol sender with the policy-based TCP stack configuration information for the data flows identified. A transmitter module (not shown) located within the network interface 1520, is configured to transmit the data flows identified using the TCP stack configuration of the sender between the protocol sender and the protocol acceleration module, and using the policy-based TCP stack configuration between the protocol acceleration module 1500 and the protocol receiver.

In a further embodiment, the monitoring module 1550 is configured to diagnose information related to TCP performance of the one of the plurality of data flows transmitting the plurality of data packets between the protocol sender and the protocol receiver. In yet another embodiment, the diagnosis information includes measurement information from a data path between the protocol sender and the protocol acceleration module 1500 or a data path between the protocol acceleration module 1500 and the protocol receiver. In another example embodiment, the diagnostic information includes one or more TCP connection characteristics. In an alternative embodiment, a management interface is configured to create the policy-based TCP stack configuration information for the plurality of data flows.

FIG. 16 illustrates an example embodiment of a flow table. The flow table 1600 may represent a portion of flow table 520 in an example embodiment. The flow table 1600 may be stored in a memory device within the protocol acceleration module 1500 or in a storage device accessible to the protocol acceleration module 1500 in one embodiment. In a further embodiment, the flow table 1600 may be stored in a memory device within the management interface 1400 or in a storage device accessible to the management interface 1600. The flow table 1600 includes fields VLAN 1610 (also referred to as virtual local area network), Virtual Network ID 1620, Protocol 1630, Source IP 1640, Destination IP 1650, Source Port 1660, Destination Port 1670 and Configuration 1680. Source IP 1640, Destination IP 1650, Source Port 1660 and Destination Port 1670 represent some of the TCP header fields. For an example embodiment, one or more of the following fields: VLAN 1610, Virtual Network ID 1620, Protocol 1630, Source IP 1640, Destination IP 1650, Source Port 1660, and Destination Port 1670, alone or in combination, may be used to identify a data flow for transmitting data packets. For an example embodiment, the result of the classification is referred to as the configuration and is shown in the field Configuration 1680.

The Rows 1690 and 1691 represent two rows in the flow table 1600 for TCP protocols. In alternative embodiments, other network communication protocols may be used. Row 1690 illustrates example data related to a first configuration (referred to as config1) and row 1691 illustrates example data related to a second configuration (referred to as config2). The configuration parameters are shown below:

```
Configuration {
    BufferSize - the size of the buffer in bytes
    CongestionControlAlgorithm - the algorithms are Reno, Bic, Cubic
    DupAckThreshold - number of duplicate AKCs after which sender
    will fast-retransmit
    InitialCongestionWindow - Number of maximally sized TCP
    segments that we can initially send before receiving an ACK.
    SlowStartThreshold - Number of bytes for the exponential phase
}
```

The configuration parameters may be referred to as a policy-based TCP stack configuration information. The policy-based TCP stack configuration information may represent the parameters shown above, or in an alternative embodiment, the configuration parameters may vary. The configuration parameters Buffer Size, Congestion Control Algorithm, DupAckThreshold, InitialCongestionWindow and SlowStartThreshold represent TCP protocol parameters used for flow control and/or congestion control of TCP packets. These parameters may be used to control the TCP protocol behavior.

The configuration parameters for the second configuration (config2) are shown

```
Configuration config1 = {
    BufferSize : 100000b
    CongestionControlAlgorithm : "reno"
    DupAckThreshold : 2
    InitialCongestionWindow : 10
    SlowStartThreshold : 10000b
}
```

The configuration parameters for the first configuration (config1) are shown below:

```
Configuration config2 = {
    BufferSize : 300000b
    CongestionControlAlgorithm : "cubic"
    DupAckThreshold : 2
    InitialCongestionWindow : 10
    SlowStartThreshold : 10000b
}
```

In alternative embodiments, the flow table 1600 used by the protocol acceleration module 1500 or the management interface 1400 may include additional fields or different fields than the example shown in the flow table 1600. The configuration parameters stored in the flow table, or referenced in the flow table 1600, may be referred to as a policy-based TCP stack configuration information.

Below is a description of TCP fields included in a TCP header for TCP data packets. One or more of the TCP header fields may represent TCP stack configuration information. Generally, the TCP stack configuration information of the protocol sender is included within the TCP data packets transmitted. One or more of the TCP stack configuration information may be overridden or modified by the policy-based TCP stack configuration information specified in a flow table (e.g., the flow table 1600) of a protocol acceleration module (e.g., 1500) or management interface (1400). For one embodiment, the policy-based TCP stack configuration information for the data flows modifies the TCP stack configuration information of the TCP sender without changing the TCP stack configuration of the protocol sender. In other words, the behavior of the TCP protocols is modified without changing the TCP stack configuration of the protocol sender, which may be a guest or virtualized TCP sender. Thus, the behavior of the TCP protocols may be modified without accessing the protocol sender.

Source port (16 bits): Identifies the sending port

Destination port (16 bits): Identifies the receiving port

Sequence number (32 bits) has a dual role: If the SYN flag is set (1), then this is the initial sequence number. The sequence number of the actual first data byte and the acknowledged number in the corresponding ACK are then this sequence number plus 1. If the SYN flag is clear (0), then this is the accumulated sequence number of the first data byte of this segment for the current session.

Acknowledgment number (32 bits): If the ACK flag is set then the value of this field is the next sequence number that the receiver is expecting. This acknowledges receipt of all prior bytes (if any). The first ACK sent by each end acknowledges the other end's initial sequence number itself, but no data.

Data offset (4 bits): Specifies the size of the TCP header in 32-bit words. The minimum size header is 5 words and the maximum is 15 words thus giving the minimum size of 20 bytes and maximum of 60 bytes, allowing for up to 40 bytes of options in the header. This field gets its name from the fact that it is also the offset from the start of the TCP segment to the actual data.

Reserved (3 bits): For future use and should be set to zero

Flags (9 bits) (also referred to as Control bits): Contains 9 1-bit flags

NS (1 bit): ECN-nonce concealment protection (added to header by RFC 3540).

CWR (1 bit): Congestion Window Reduced (CWR) flag is set by the sending host to indicate that it received a TCP segment with the ECE flag set and responded in congestion control mechanism (added to header by RFC 3168).

ECE (1 bit): ECN-Echo indicates

URG (1 bit): Indicates that the Urgent pointer field is significant

ACK (1 bit): Indicates that the Acknowledgment field is significant. All packets after the initial SYN packet sent by the client should have this flag set.

PSH (1 bit): Push function. Asks to push the buffered data to the receiving application.

RST (1 bit): Resets the connection

SYN (1 bit): Synchronizes sequence numbers. Only the first packet sent from each end should have this flag set. Some other flags change meaning based on this flag, and some are only valid for when it is set, and others when it is clear. If the SYN flag is set (1), then the TCP peer is ECN capable. If the SYN flag is clear (0), then a packet with Congestion Experienced flag in IP header set is received during normal transmission (added to header by RFC 3168).

FIN (1 bit): No more data from sender

Window size (16 bits): The size of the receive window, which specifies the number of window size units (by default, bytes) (beyond the sequence number in the acknowledgment field) that the sender of this segment is currently willing to receive (see Flow control and Window Scaling)

Checksum (16 bits): The 16-bit checksum field is used for error-checking of the header and data Urgent pointer (16 bits): If the URG flag is set, then this 16-bit field is an offset from the sequence number indicating the last urgent data byte.

Options (Variable 0-320 bits, divisible by 32): The length of this field is determined by the data offset field.

Padding: The TCP header padding is used to ensure that the TCP header ends and data begins on a 32 bit boundary. The padding is composed of zeros.

Figure 17:
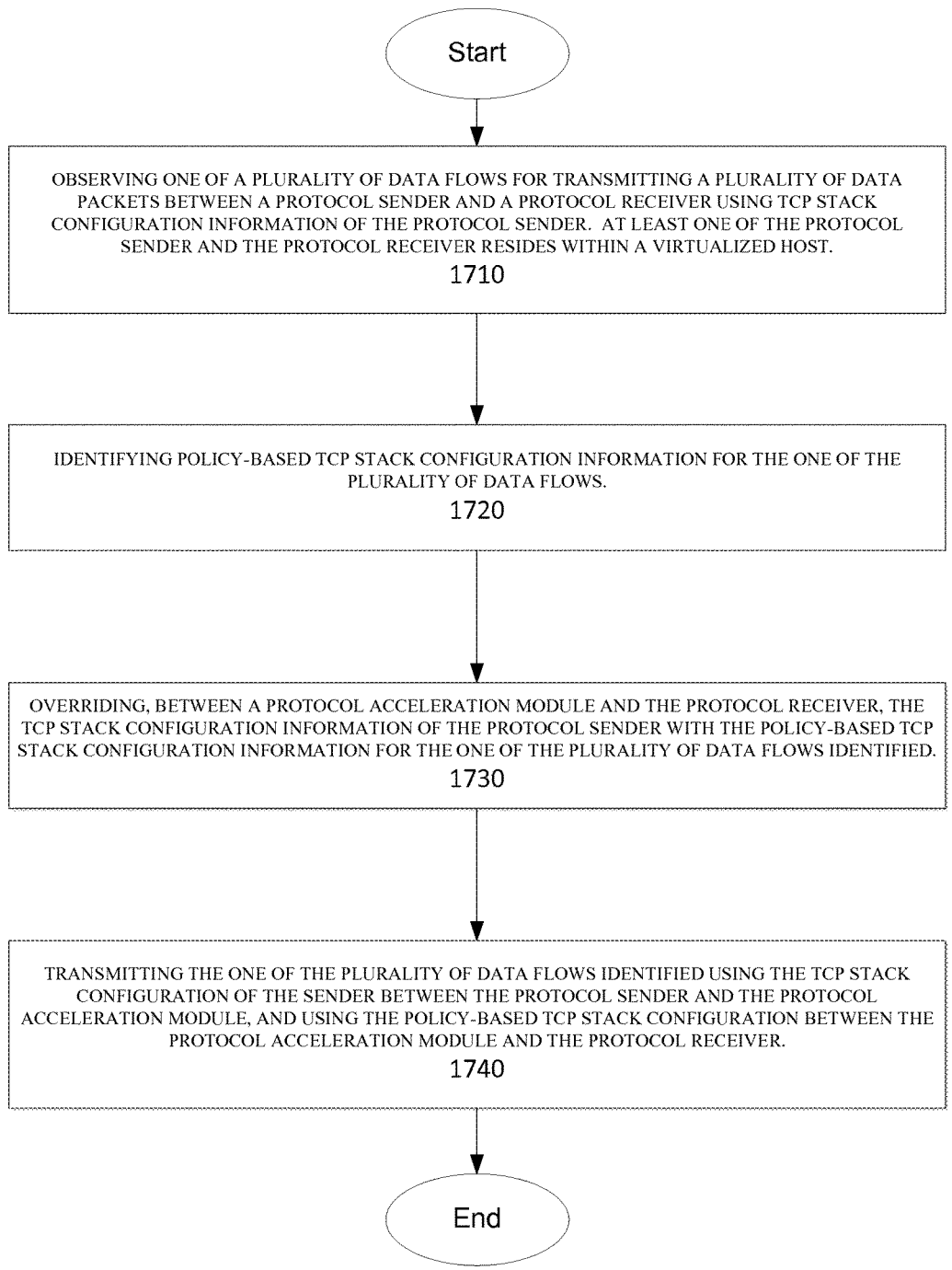
FIG. 17 is a flow chart illustrating a method for transmitting data packets using policy-based TCP stack configuration information according to one embodiment.
Figure 18:
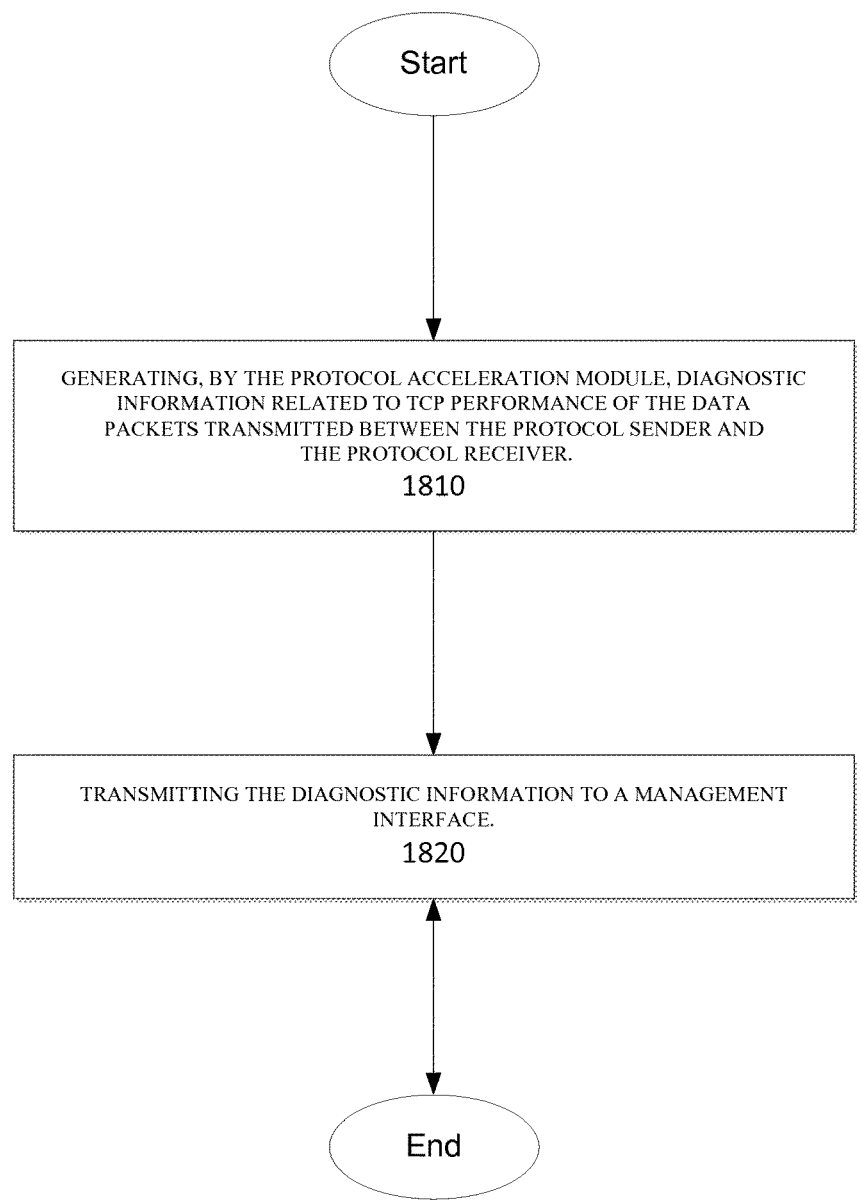
FIG. 18 is a flow chart illustrating a method for generating and transmitting diagnostic information according to one embodiment.
Figure 19:
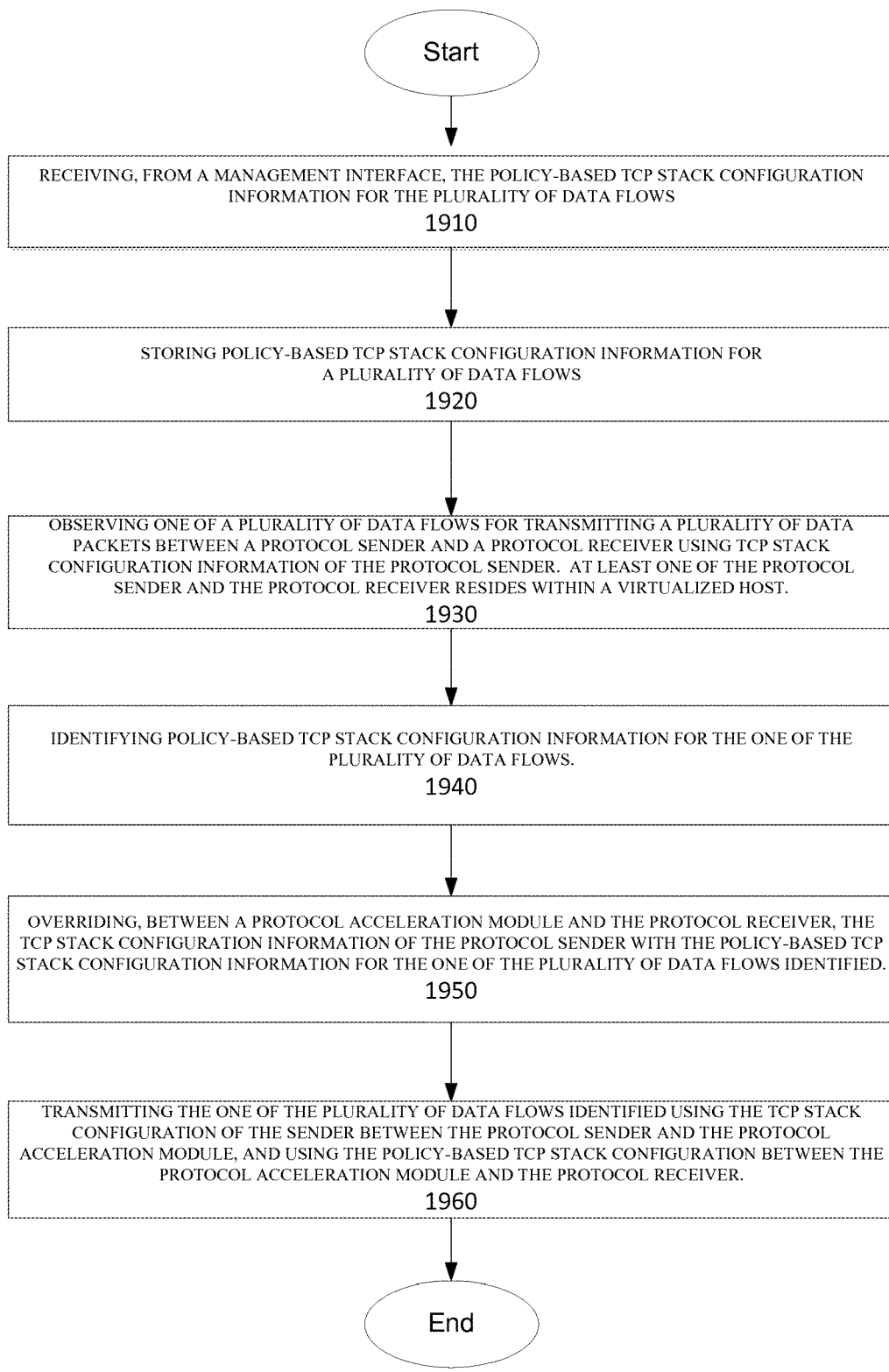
FIG. 19 is a flow chart illustrating a method for transmitting data packets using policy-based TCP stack configuration information according to another embodiment.
Figure 20:
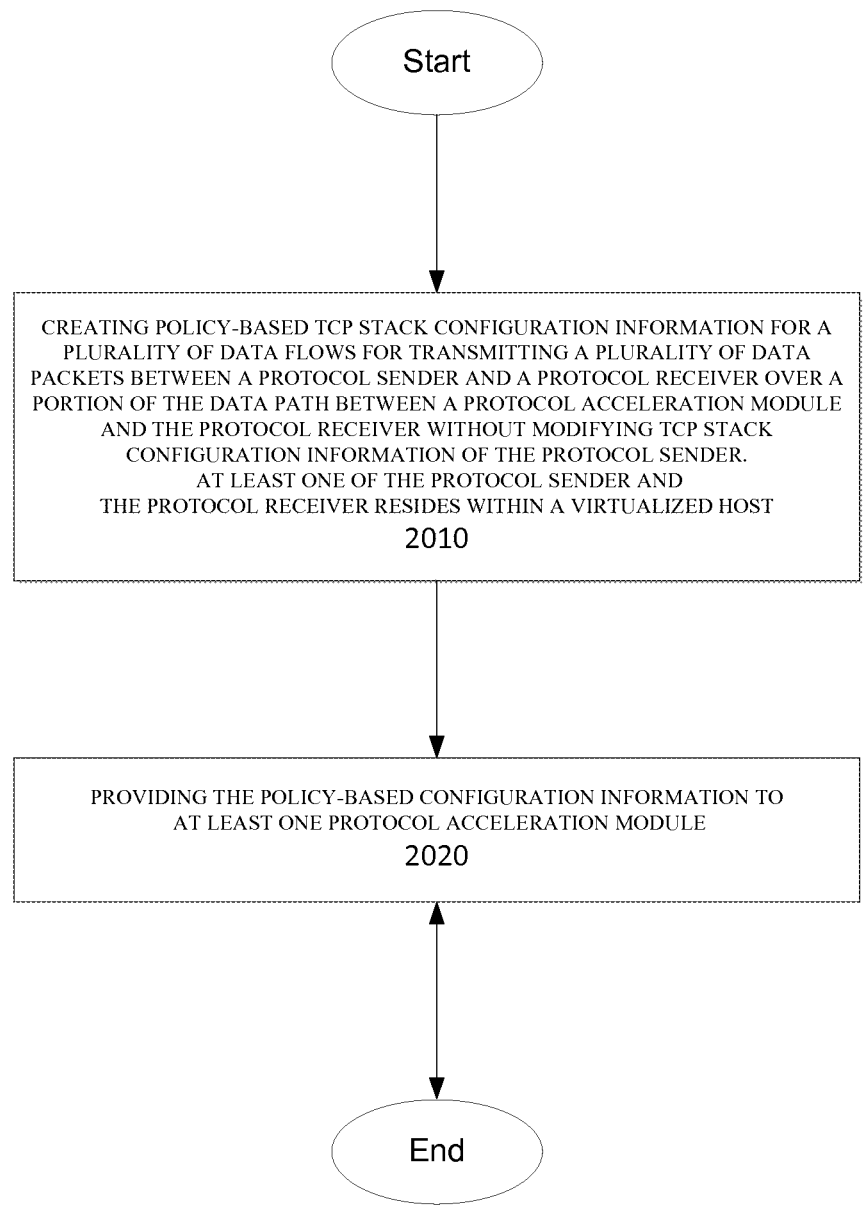
FIG. 20 is a flow chart illustrating a method for creating policy-based TCP stack configuration information according to an embodiment.
Figure 21:
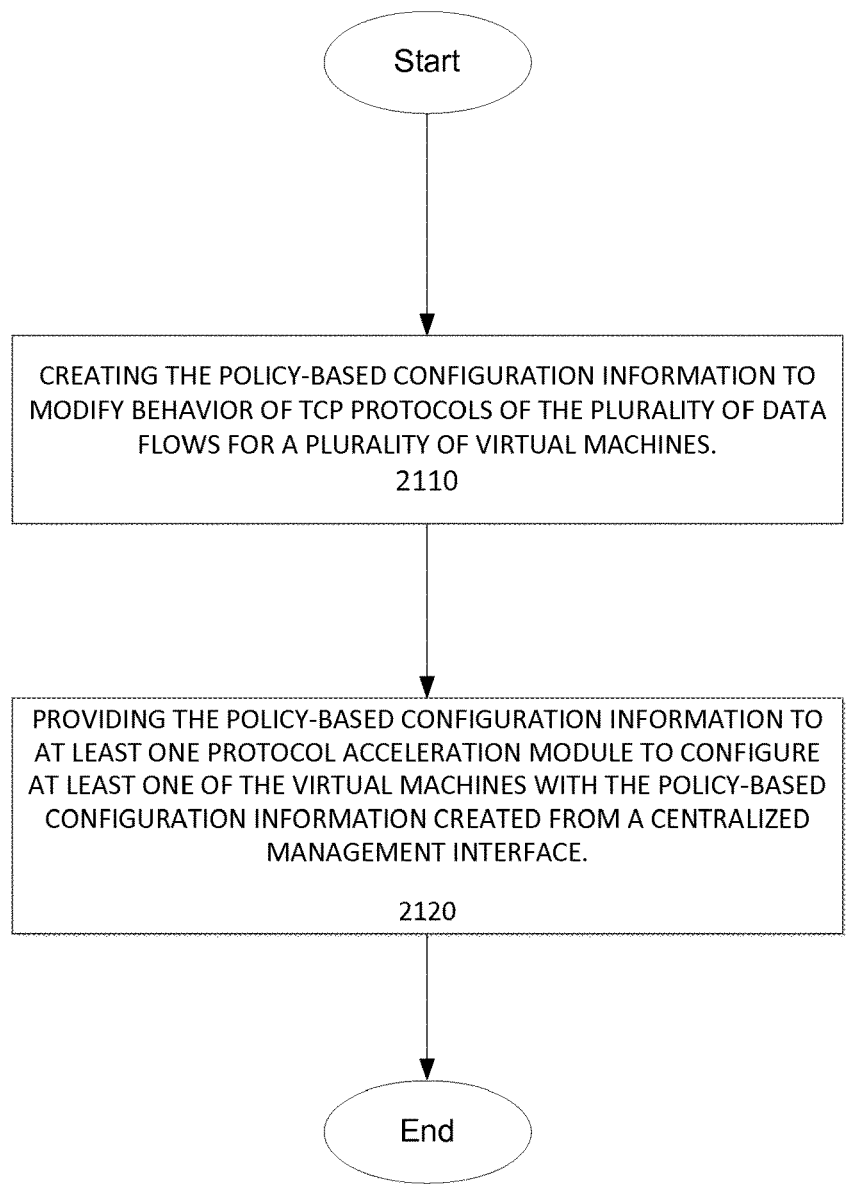
FIG. 21 is a flow chart illustrating a method for creating policy-based TCP stack configuration information according to another embodiment.
Figure 22:
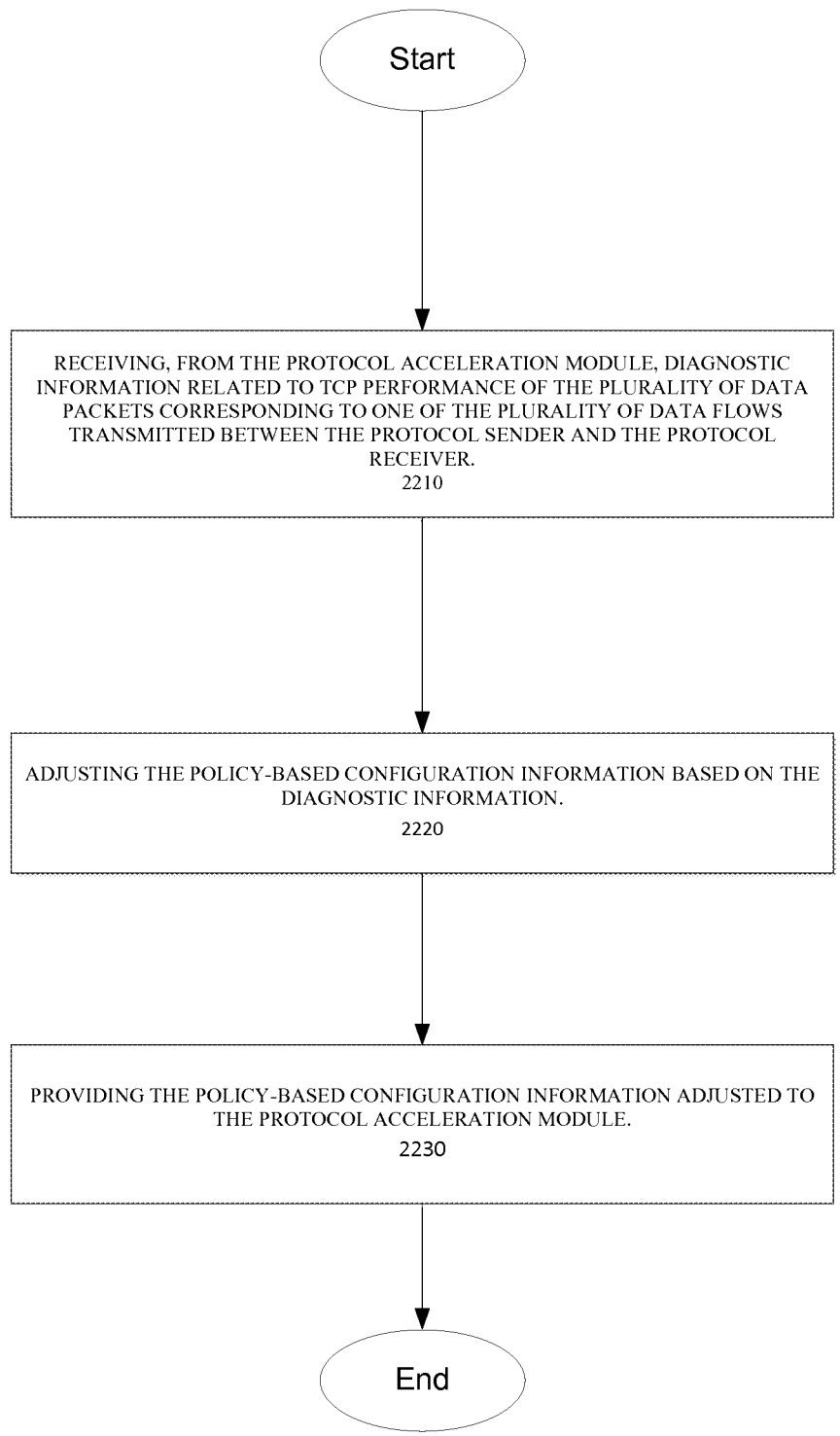
FIG. 22 is a flow chart illustrating a method for creating adjusted policy-based TCP stack configuration information according to an embodiment.

FIGS. 17-19 illustrate flow charts describing methods for transmitting data packets using policy-based TCP stack configuration information, and FIGS. 20-22 illustrate flow charts describing methods for creating policy-based TCP stack configuration information. The methods 1700-2200 may be embodied in computer-readable instructions for execution by one or more processors such that methods 1700-2200 may be carried out in whole or in part by a data center 100 using one or more computer systems 800. In example embodiments, the methods 1700-1900 may be carried out by one or more modules within the protocol acceleration module 1500. In other example embodiments, the methods 1700-2200 may be carried out by one or more modules within the management interface 1400. However, it should be appreciated that methods 1700-2200 may be deployed on various other hardware configurations or system configurations and are not intended to be limited to the modules within the management interface 1400 and/or the protocol acceleration module 1500.

FIG. 17 is a flow chart illustrating a method for transmitting data packets using policy-based TCP stack configuration information according to one embodiment. In an example, a method 1700 includes observing data flows for transmitting a plurality of data packets between a protocol sender and a protocol receiver using TCP stack configuration information of the protocol sender, and at least one of the protocol sender and the protocol receiver resides within a virtualized host at operation 1710. The method 1700 includes identifying policy-based TCP stack configuration information for the data flows at operation 1720. The method 1700 also includes overriding, between a protocol acceleration module and the protocol receiver, the TCP stack configuration information of the protocol sender with the policy-based TCP stack configuration information for data flows identified at operation 1730. The method 1700 also includes transmitting the data flows identified using the TCP stack configuration of the sender between the protocol sender and the protocol acceleration module, and using the policy-based TCP stack configuration between the protocol acceleration module and the protocol receiver at operation 1740.

In an example embodiment, the TCP stack configuration information of the protocol sender overrides the policy-based TCP stack configuration information for the one of the data flows between the protocol acceleration module and the protocol receiver without changing the TCP stack configuration information of the protocol sender. In a further embodiment, the policy-based TCP stack configuration information for the plurality of data flows represents flow classification information for organizing the plurality of data packets with different characteristics into different classes using certain criteria. In yet another embodiment, the flow classification information may classify one or more of the plurality of packets according to particular applications.

In another example embodiment, the method 1700 may include storing the policy-based TCP stack configuration information within the protocol acceleration module in a flow table; observing, by the protocol acceleration module, the one of the plurality of data flows; and identifying, by the protocol acceleration module, the policy-based TCP stack configuration information for the one of the plurality of data flows.

FIG. 18 is a flow chart illustrating a method for generating and transmitting diagnostic information according to one embodiment. In an example, a method 1800 includes: generating, by the protocol acceleration module, diagnosis information related to TCP performance of the data packets transmitted between the protocol sender and the protocol receiver at operation 1810; and transmitting the diagnostic information to a management interface at operation 1820. In a further embodiment, the method 1800 may include receiving, from the management interface, adjusted policy-based TCP stack configuration information for the one of the plurality of data flows, the one of the plurality of data flows having corresponding classifier information, the adjusted policy-based TCP stack configuration information adjusted based on the diagnosis information.

In an example embodiment, the diagnosis information includes measurement information from one or more portions of the data path between the protocol sender and the protocol receiver. One portion of the data path may include measurement information between the protocol sender and the protocol acceleration module. Another portion of the data path may include measurement information between the protocol acceleration module and the protocol receiver. In a further embodiment, the diagnosis information includes one or more TCP connection characteristics.

FIG. 19 is a flow chart illustrating a method for transmitting data packets using policy-based TCP stack configuration information according to another embodiment. In an example, a method 1900 includes receiving, from a management interface, the policy-based TCP stack configuration information for data flows at operation 1910; and storing policy-based TCP stack configuration information for the data flows at operation 1920. The method 1900 also includes observing the data flows for transmitting the data packets between a protocol sender and a protocol receiver using TCP stack configuration information of the protocol sender, wherein at least one of the protocol sender and the protocol receiver resides within a virtualized host at operation 1930; identifying policy-based TCP stack configuration information for the data flows at operation 1940; overriding, between a protocol acceleration module and the protocol receiver, the TCP stack configuration information of the protocol sender with the policy-based TCP stack configuration information for data flows identified at operation 1950; and transmitting the data flows identified using the TCP stack configuration of the sender between the protocol sender and the protocol acceleration module, and using the policy-based TCP stack configuration between the protocol acceleration module and the protocol receiver at operation 1960.

FIG. 20 is a flow chart illustrating a method for creating policy-based TCP stack configuration information according to an embodiment. In an example embodiment, a method 2000 includes creating policy-based TCP stack configuration information for a plurality of data flows for transmitting a plurality of data packets between a protocol sender and a protocol receiver over a portion of the data path between a protocol acceleration module and the protocol receiver without modifying TCP stack configuration information of the protocol sender at operation 2010. At least one of the protocol sender and the protocol receiver resides within a virtualized host at operation 2010. The method 2000 also includes providing the policy-based configuration information to at least one protocol acceleration module at operation 2020.

In another embodiment, creating the policy-based configuration information includes adjusting one or more TCP stack configuration values included within the policy-based configuration information for at least one data flow in the plurality of data flows. In a further embodiment, the one or more TCP header field values included within the one or more TCP configuration values is adjusted. In an alternative embodiment, the one or more TCP stack configuration values for the at least one data flow in the plurality of data flows is adjusted one or more times before a connection is established between the protocol sender and the protocol receiver, or during the established connection between the protocol sender and the protocol receiver. In yet another embodiment, the one or more TCP stack configuration values for the at least one data flow in the plurality of data flows is adjusted to transfer a predetermined amount of data during a connection between the protocol sender and the protocol receiver. In another example embodiment, the one or more TCP configuration values for the at least one data flow in the plurality of data flows is adjusted to transfer the one or more data packets during a predetermined amount of time during a connection between the protocol sender and the protocol receiver. In a further embodiment, adjusting one or more TCP stack configuration information is adjusted on a per-flow basis.

FIG. 21 is a flow chart illustrating a method for creating policy-based TCP stack configuration information according to another embodiment. In an example, a method 2100 includes: creating the policy-based configuration information to modify behavior of TCP protocols of the plurality of data flows for a plurality of virtual machines at operation 2110; and providing the policy-based configuration information to at least one protocol acceleration module to configure at least one of the virtual machines with the policy-based configuration information created from a centralized management interface at operation 2120.

In an example embodiment, creating the policy-based configuration information includes creating flow classifiers having classifier information representing a set of data packet matching rules.

FIG. 22 is a flow chart illustrating a method for creating adjusted policy-based TCP stack configuration information according to an embodiment. In an example, a method 2200 includes: receiving, from the protocol acceleration module, diagnosis information related to TCP performance of the plurality of data packets corresponding to one of the plurality of data flows transmitted between the protocol sender and the protocol receiver at operation 2210; adjusting the policy-based configuration information based on the diagnosis information at operation 2220; and providing the policy-based configuration information adjusted to the protocol acceleration module at operation 2230. In a further embodiment, the diagnosis information includes measurement information from one portion of the data path between the protocol and the protocol acceleration module. In another embodiment, the diagnosis information includes measurement information from another portion of the data path between the protocol acceleration module to the protocol receiver. In another embodiment, the diagnosis information includes one or more TCP connection characteristics.

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware may generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules may provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and may operate on a resource (e.g., a collection of information).

Figure 8:
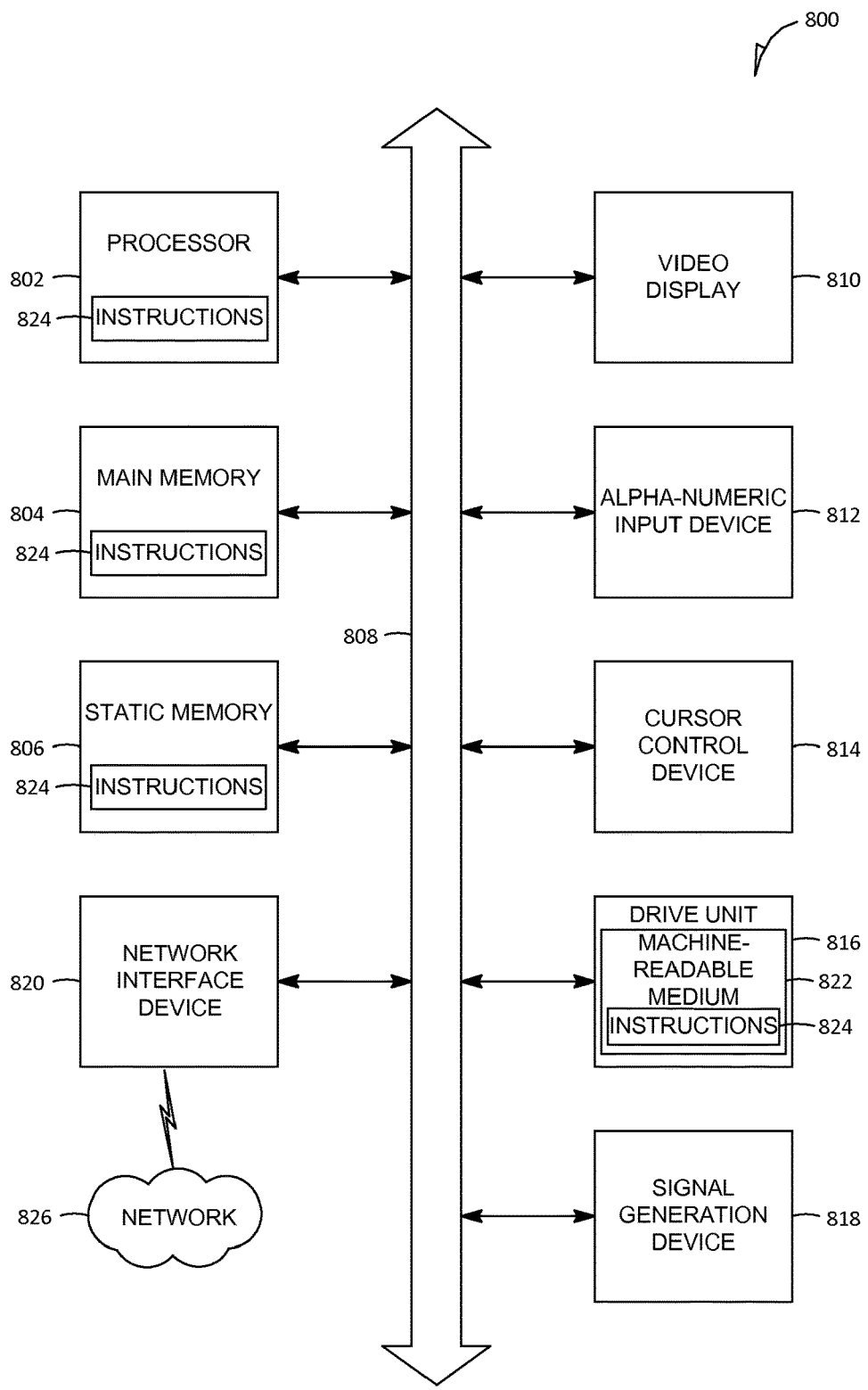
FIG. 8 shows a diagrammatic representation of machine in the example form of a computer system within which a set of instructions that, when executed, may cause the machine to perform any one or more of the methodologies discussed herein.

FIG. 8 shows a diagrammatic representation of a machine in the example form of a computer system 800 within which resides a set of instructions 824 that, when executed, may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions 824 (e.g., software) embodying any one or more of the methodologies or functions described herein. The instructions 824 may also reside, completely or at least partially, within the main memory 804, the static memory 806, and/or within the processor 802 during execution thereof by the computer system 800. The main memory 804 and the processor 802 also may constitute machine-readable media. The instructions 824 may further be transmitted or received over a network 826 via the network interface device 820. While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions 824. The term "machine-readable medium" shall also be taken to include any medium that is capable of storing, encoding or carrying a set of instructions (e.g., instructions 824) for execution by the machine and that cause the machine to perform any one or more of the methodologies of the various embodiments, or that is capable of storing, encoding or carrying data structures utilized by or associated with such a set of instructions. The term "machine-readable medium" shall accordingly be taken to include, but not be limited to, solid-state memories, optical media, and magnetic media.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A system, comprising:
   a memory that stores computer executable components;
   a processor that executes computer executable components stored in the memory, wherein the computer executable components comprise:
      a data flow identification component configured to identify first configuration data indicative of TCP stack configuration information for a data flow transmitted between a protocol sender and a protocol receiver, wherein at least one of the protocol sender and the protocol receiver resides within a virtualized host;
      a protocol override component configured to override the first configuration data with second configuration data indicative of policy-based TCP stack configuration information for the data flow;
      a transmitter component configured to transmit the data flow to the protocol receiver using the second configuration data indicative of the policy-based TCP stack configuration; and
      a diagnostics component configured to generate diagnostics data indicative of TCP performance associated with the data flow and determine, based on the diagnostics data, that the data flow to the protocol receiver is being slowed by resource scheduling being performed by the virtualized host.

2. The system of claim 1, wherein generating diagnostics data indicative of TCP performance associated with the data flow includes determining round-trip times associated with transmitting the data flow to the protocol receiver.

3. The system of claim 2, wherein the protocol override component is configured to adjust the second configuration data based on the diagnostic data.

4. The system of claim 2, wherein the diagnostics data comprises one or more TCP connection characteristics associated with the data flow.

5. The system of claim 1, wherein the computer executable components further comprise:
a measurement component configured to generate measurement data indicative of a measurement associated with a data path between the protocol sender and the system.

6. The system of claim 5, wherein the protocol override component is configured to adjust the second configuration data based on the measurement data.

7. The system of claim 1, wherein the computer executable components further comprise:
a measurement component configured to generate measurement data indicative of a measurement associated with a data path between the system and the protocol receiver.

8. The system of claim 7, wherein the protocol override component is configured to adjust the second configuration data based on the measurement data.

9. A method, comprising:
determining, by a system comprising a processor, first configuration data indicative of TCP stack configuration information for a data flow transmitted by a protocol sender;
overriding the first configuration data with second configuration data indicative of policy-based TCP stack configuration information for the data flow;
sending the data flow to a protocol receiver based on the second configuration data indicative of the policy-based TCP stack configuration, wherein at least one of the protocol sender and the protocol receiver resides within a virtualized host;
generating diagnostic data indicative of TCP performance of one or more data packets corresponding to the data flow transmitted by the protocol sender; and
determining, based on the diagnostic data, that the data flow transmitted by the protocol sender is being slowed by resource scheduling being performed by the virtualized host.

10. The method of claim 9, wherein the overriding comprises overriding the first configuration data with the second configuration data without altering the TCP stack configuration information.

11. The method of claim 9, further comprising:
observing a plurality of data flows transmitted between the protocol sender and the protocol receiver to facilitate the identifying the first configuration data.

12. The method of claim 9, further comprising:
adjusting the second configuration data based on the diagnostic data.

13. The method of claim 9, further comprising:
generating measurement data indicative of measurement information associated with a data path between the system and the protocol sender; and
adjusting the second configuration data based on the measurement data.

14. The method of claim 9, further comprising:
generating measurement data indicative of measurement information associated with a data path between the system and the protocol receiver; and
adjusting the second configuration data based on the measurement data.

15. The method of claim 9, further comprising:
storing the second configuration data in a flow data structure shared between the protocol sender and the protocol receiver.

16. A non-transitory machine-readable storage medium comprising executable instructions that, when executed by a processor, facilitate performance of operations, comprising:
generating configuration data indicative of policy-based TCP stack configuration information for a data flow transmitted between a protocol sender and a protocol receiver, wherein at least one of the protocol sender and the protocol receiver resides within a virtualized host;
generating diagnostic data indicative of TCP performance associated with the data flow;
determining, based on the diagnostics data, that the data flow transmitted between the protocol sender and the protocol receiver is being slowed by resource scheduling being performed by the virtualized host;
adjusting the configuration data based on the diagnostic data; and
transmitting the data flow to the protocol receiver based on the configuration data indicative of the policy-based TCP stack configuration.

17. The non-transitory machine-readable storage medium of claim 16, wherein the operations further comprise:
identifying other configuration data indicative of TCP stack configuration information for the data flow.

18. The non-transitory machine-readable storage medium of claim 17, wherein the operations further comprise:
overriding the other configuration data with the configuration data indicative of the policy-based TCP stack configuration information.

19. The non-transitory machine-readable storage medium of claim 16, wherein the operations further comprise:
generating measurement data indicative of measurement information associated with a data path between the protocol sender and a protocol acceleration module associated with the processor.

20. The non-transitory machine-readable storage medium of claim 19, wherein the operations further comprise:
adjusting the configuration data based on the measurement data.

* * * * *